United States Patent
Park et al.

(10) Patent No.: US 10,254,579 B2
(45) Date of Patent: Apr. 9, 2019

(54) CURVED DISPLAY DEVICE

(71) Applicant: LG Display Co., Ltd., Seoul (KR)

(72) Inventors: Jong-Sin Park, Gyeonggi-do (KR);
Se-Hong Park, Gyeonggi-do (KR);
Yi-Yeon Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 47 days.

(21) Appl. No.: 15/388,423

(22) Filed: Dec. 22, 2016

(65) Prior Publication Data
US 2018/0031906 A1    Feb. 1, 2018

(30) Foreign Application Priority Data

Jul. 29, 2016 (KR) .................. 10-2016-0096985
Oct. 31, 2016 (KR) .................. 10-2016-0143279

(51) Int. Cl.
*G02F 1/1335* (2006.01)
*G02F 1/1343* (2006.01)
*G02F 1/1362* (2006.01)

(52) U.S. Cl.
CPC .. *G02F 1/133512* (2013.01); *G02F 1/133514* (2013.01); *G02F 1/134309* (2013.01); *G02F 1/136286* (2013.01); *G02F 2001/134345* (2013.01); *G02F 2201/121* (2013.01); *G02F 2201/56* (2013.01)

(58) Field of Classification Search
CPC ................................................. G02F 1/1335
See application file for complete search history.

(56) References Cited

U.S. PATENT DOCUMENTS

2008/0049048 A1*  2/2008  Credelle ............ G09G 3/2074
                                                          345/690
2008/0137013 A1*  6/2008  Kamoshida ........... G02F 1/1333
                           (Continued)

FOREIGN PATENT DOCUMENTS

JP    2007-333818 A       12/2007
JP    2010-008875    *     1/2010  ........... G02F 1/1335
JP    2010-008875 A        1/2010

OTHER PUBLICATIONS

Office Action dated Nov. 14, 2017 from the Japanese Patent Office in related Japanese application No. 2016-0254867.
(Continued)

*Primary Examiner* — Sang V Nguyen
(74) *Attorney, Agent, or Firm* — Morgan, Lewis & Bockius LLP

(57) ABSTRACT

A curved display device includes: first and second substrates having a first panel portion at a center thereof and having second and third panel portions at respective sides of the first panel portion; gate and data lines crossing each other to define a plurality of sub-pixels; a black matrix having a plurality of open portions corresponding to respective ones of the sub-pixels; and first to third color filters between the black matrix and the first substrate. The black matrix between the open portions has first to third black matrix widths in the first to third panel portions, respectively, and the open portion has first to third open portion widths in the first to third panel portions, respectively. Each of the second and third BM widths is equal to or greater than the first black matrix width, and the second and third BM widths are equal to each other.

19 Claims, 13 Drawing Sheets

(56) References Cited

U.S. PATENT DOCUMENTS

| | | | | |
|---|---|---|---|---|
| 2009/0015768 A1* | 1/2009 | Igeta | ................. | G02F 1/133512 |
| | | | | 349/106 |
| 2009/0033845 A1* | 2/2009 | Tanno | ............... | G02F 1/134363 |
| | | | | 349/106 |
| 2009/0309821 A1* | 12/2009 | Tanno | ............... | G02F 1/133514 |
| | | | | 345/87 |
| 2011/0043552 A1* | 2/2011 | Brown Elliott | ...... | G09G 3/3406 |
| | | | | 345/694 |
| 2015/0302808 A1* | 10/2015 | Wang | .................... | G02F 1/1335 |
| | | | | 345/691 |
| 2015/0362796 A1* | 12/2015 | Kong | .................... | G02F 1/1335 |
| 2016/0202544 A1* | 7/2016 | Ro | ........................ | G02F 1/1362 |
| | | | | 359/890 |
| 2016/0349561 A1* | 12/2016 | Shiina | ................. | G02F 1/13394 |

OTHER PUBLICATIONS

Communication dated Jun. 2, 2017 from the European Patent Office in counterpart European application No. 16207018.9.

* cited by examiner

CURVED DISPLAY DEVICE

CROSS-REFERENCE TO RELATED APPLICATION

This application claims the benefit under 35 U.S.C. § 119(a) of Korean Patent Application No. 10-2016-0143279, filed on Oct. 31, 2016, and No. 10-2016-0096985, filed on Jul. 29, 2016, in the Korean Intellectual Property Office, which are incorporated herein by reference in their entirety.

BACKGROUND

1. Technical Field

The present disclosure relates to a display device, and more particularly, to a curved display device where an aperture ratio and a brightness are improved by adjusting a width and a position of a black matrix.

2. Discussion of the Related Art

Recently, as the information society progresses, display devices processing and displaying a large amount of information have rapidly advanced, and various flat panel displays (FPDs) have been developed for providing a thin profile, a light weight and a low power consumption. As a result, a thin film transistor liquid crystal display (TFT-LCD) device having an excellent color reproducibility and a thin profile has been developed. The LCD device displays an image using an optical anisotropy and a polarization of a liquid crystal molecule.

An LCD device includes two substrates facing and spaced apart from each other and a liquid crystal layer between the two substrates. A pixel electrode and a first orientation film are sequentially formed on an inner surface of one of the two substrates, and a common electrode and a second orientation film are sequentially formed on an inner surface of the other one of the two substrates. First and second polarizing plates are formed on outer surfaces, respectively, of the two substrates.

A curved display device has been suggested as a next generation display device instead of a flat panel display. The curved display device improves a user engagement and a user feels comfortable by a realistic image. In the related art curved display device, a color crosstalk occurs wherein colors of adjacent sub-pixels are mixed by a curved shape.

FIG. 1 is a view showing a plane surface and a cross-sectional surface of a curved liquid crystal display device according to the related art. For convenience of illustration, a curved shape is shown as a flat shape.

In FIG. 1, a curved display device 10 according to the related art includes first and second substrates 20 and 40 facing and spaced apart from each other and a liquid crystal layer 50 between the first and second substrates 20 and 40. Each of the first and second substrates 20 and 40 includes a plurality of sub-pixels SP displaying red, green, and blue colors.

A gate line 22 is formed on an inner surface of the first substrate 20, and a gate insulating layer (not shown) is formed on the gate line 22. A common electrode 24 is formed on the gate insulating layer in each sub-pixel SP, and a first insulating layer 26 is formed on the common electrode 24. A data line 28 is formed on the first insulating layer 26 at a border between sub-pixels SP, and a second insulating layer 30 is formed on the data line 28.

The gate line 22 and the data line 28 cross each other to define the sub-pixel SP, and a thin film transistor (TFT) T connected to the gate line 22 and the data line 28 is formed in each sub-pixel SP. A pixel electrode 32 is formed on the second insulating layer 30 in each sub-pixel SP.

A black matrix 42 is formed at a border between sub-pixels SP on an inner surface of the second substrate 40, and first and second color filters 44 and 46 are formed on the black matrix 42 in each sub-pixel SP. The black matrix 42 covers the gate line 22, the data line 28 and the TFT T and has an open portion OP exposing the sub-pixel SP.

The curved LCD device 10 has a curved surface of a concave shape toward an upper portion of the second substrate 40 where a user is located. Due to the curved shape, a compressive stress along a first shift direction SD1 from an edge to a center is generated in the inner surface of the first substrate 20, and a tensile stress along a second shift direction SD2 from the center to the edge is generated in the inner surface of the second substrate 40.

A length of the inner surface of the first substrate 20 contracts along the first shift direction SD1 by the compressive stress, and a length of the inner surface of the second substrate 40 expands along the second shift direction SD2 by the tensile stress. As a result, the black matrix 42 of the second substrate 40 may not cover the data line 28 of the first substrate 20.

The first and second substrates 20 and 40 may be classified as a first panel portion A1 at the center, second and third panel portions A2 and A3 at both edges, a fourth panel portion A4 between the first and second panel portions A1 and A2 and a fifth panel portion A5 between the first and third panel portions A1 and A3. In the first panel portion A1, a central line of the black matrix 42 is exactly aligned to a central line of the data line 28 such that the open portion OP of the black matrix 42 exposes a central region of the sub-pixel SP. In the fourth and fifth panel portions A4 an A5, the central line of the black matrix 42 is shifted outwardly with respect to the central line of the data line 28 such that the open portion OP of the black matrix 42 exposes a portion of the data line 28 as well as the sub-pixel SP. In the second and third panel portions A2 and A3, the central line of the black matrix 42 is further shifted outwardly with respect to the central line of the data line 28 such that the open portion OP of the black matrix 42 exposes the adjacent two sub-pixels SP and the data line 28.

Because light corresponding to two data signals applied to the two sub-pixels SP is emitted through one color filter 44 and 46, color mixing or color crosstalk in which the colors of the adjacent sub-pixels SP are mixed may occur, thereby deteriorating a display quality of an image displayed by the curved LCD device 10.

SUMMARY

The present disclosure relates to a curved liquid crystal display device that substantially obviates one or more of the problems due to limitations and disadvantages of the related art.

An object of the present invention is to provide a curved display device in which color mixing and color crosstalk are prevented and in which image display quality is improved by forming a black matrix having an open portion of an equal width, by aligning a central line of a black matrix to a border line of adjacent two color filters in a first panel portion, and by disposing a central line of a black matrix inside or outside a border line of adjacent two color filters.

Another object of the present invention is to provide a curved display device in which color mixing and color crosstalk are prevented, a degree of a design freedom is increased, aperture ratio and brightness are improved, and image display quality is improved by forming a black matrix having an open portion of an equal width, by aligning a central line of a black matrix to a border line of adjacent two color filters in a first panel portion, and by disposing a central line of a black matrix at gradually shifted positions with respect to a border line of adjacent two color filters by blocks.

Another object of the present invention is to provide a curved display device in which color mixing and color crosstalk are prevented, image display quality is improved, and a uniform black matrix shape and a uniform display quality are obtained throughout all the sub-pixels by aligning both sides of a data line to both sides of a black matrix in a first panel portion and by aligning one side of a data line to one side of a black matrix in second and third panel portions.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, A curved display device comprises first and second substrates facing each other and spaced apart from each other, the first and second substrates having a curved shape, wherein the first and second substrates include a first panel portion at a center thereof, and second and third panel portions at respective sides of the first panel portion; gate and data lines on an inner surface of the first substrate, the gate and data lines crossing each other to define a plurality of sub-pixels; a black matrix on an inner surface of the second substrate, the black matrix having a plurality of open portions each corresponding to respective ones of the sub-pixels; and first to third color filters between the black matrix and the first substrate, wherein the black matrix between the open portions has first to third black matrix widths (BM widths) in the first to third panel portions, respectively, wherein each of the open portions has first to third open portion widths (OP widths) in the first to third panel portions, respectively, wherein each of the second and third BM widths is equal to or greater than the first BM width, and wherein the second and third BM widths are equal to each other.

In another aspect, a curved display device comprises first and second substrates facing each other and spaced apart from each other, the first and second substrates having a curved shape, wherein the first and second substrates include a first panel portion at a center thereof, and second and third panel portions at respective sides of the first panel portion; gate and data lines on an inner surface of the first substrate, the gate and data lines crossing each other to define a plurality of sub-pixels; a black matrix on an inner surface of the second substrate, the black matrix having a plurality of open portions each corresponding to respective ones of the sub-pixels; and first to third color filters between the black matrix and the first substrate, wherein the black matrix between the open portions has first to third black matrix widths (BM widths) in the first to third panel portions, respectively, wherein the open portions have first to third open portion widths (OP widths) in the first to third panel portions, respectively, wherein each of the second and third BM widths is equal to or smaller than the first BM width, and wherein the second and third BM widths are equal to each other.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
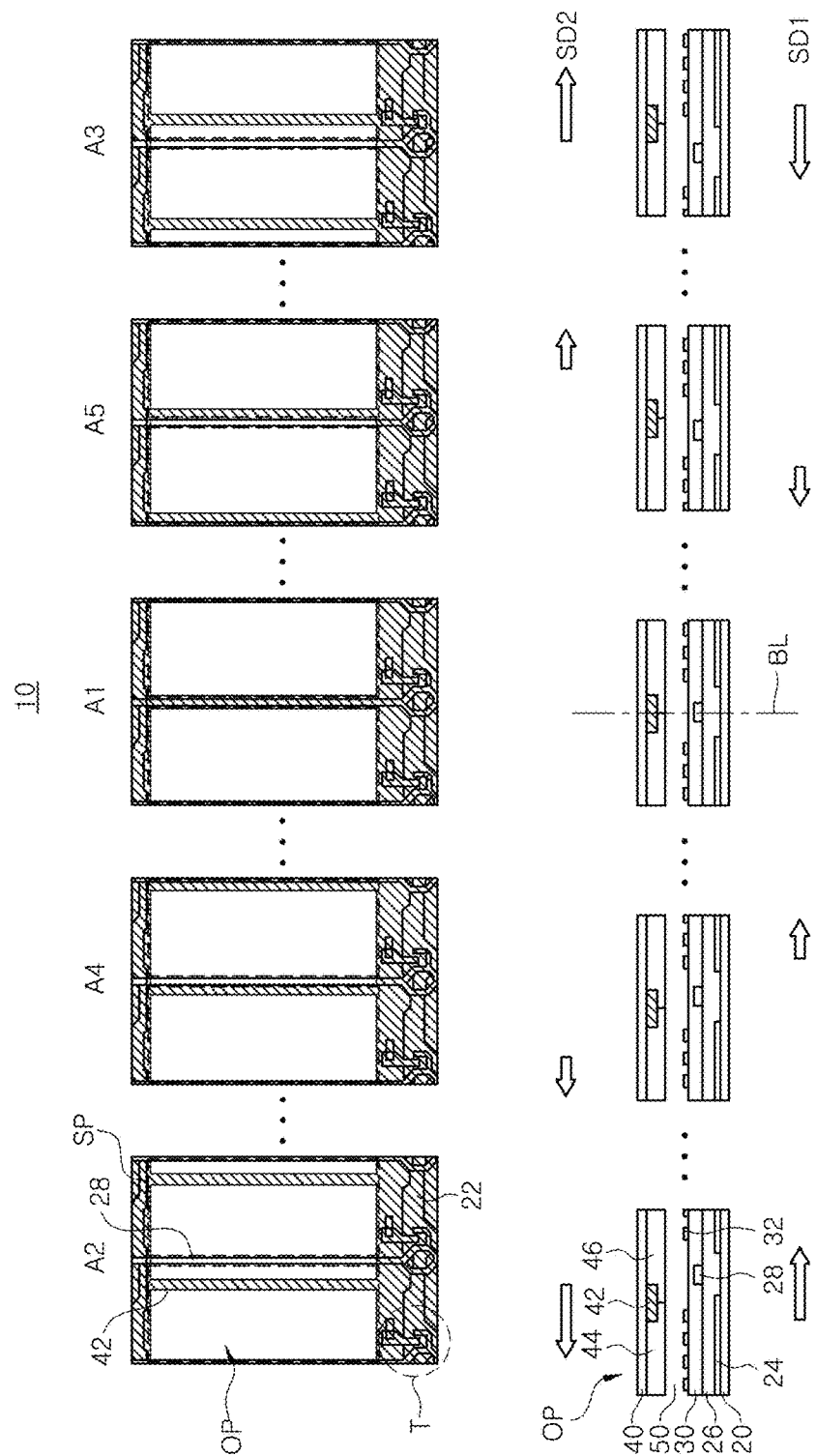
FIG. 1 is a view showing a plane surface and a cross-sectional surface of a curved liquid crystal display device according to the related art.

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
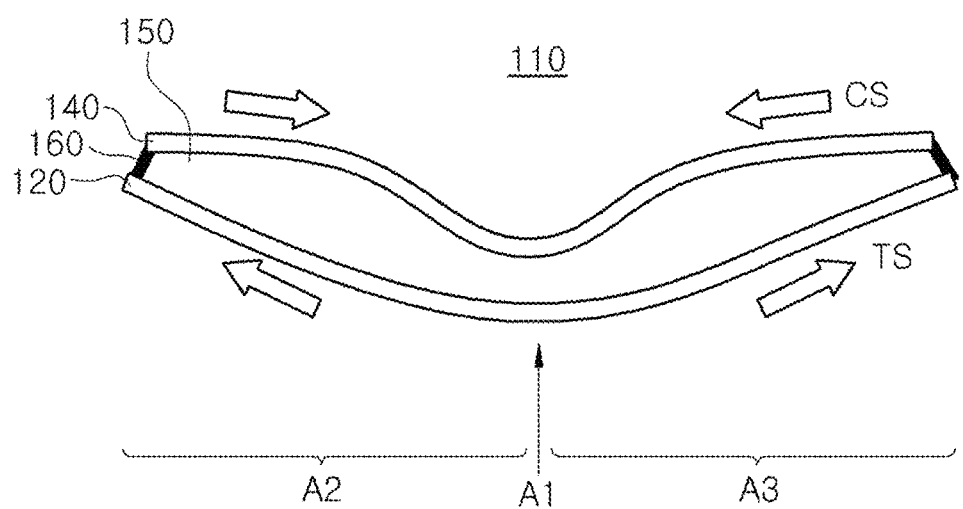
FIG. 2 is a cross-sectional view showing a curved shape and a stress of a curved display device according to a first embodiment of the present disclosure.
Figure 3:
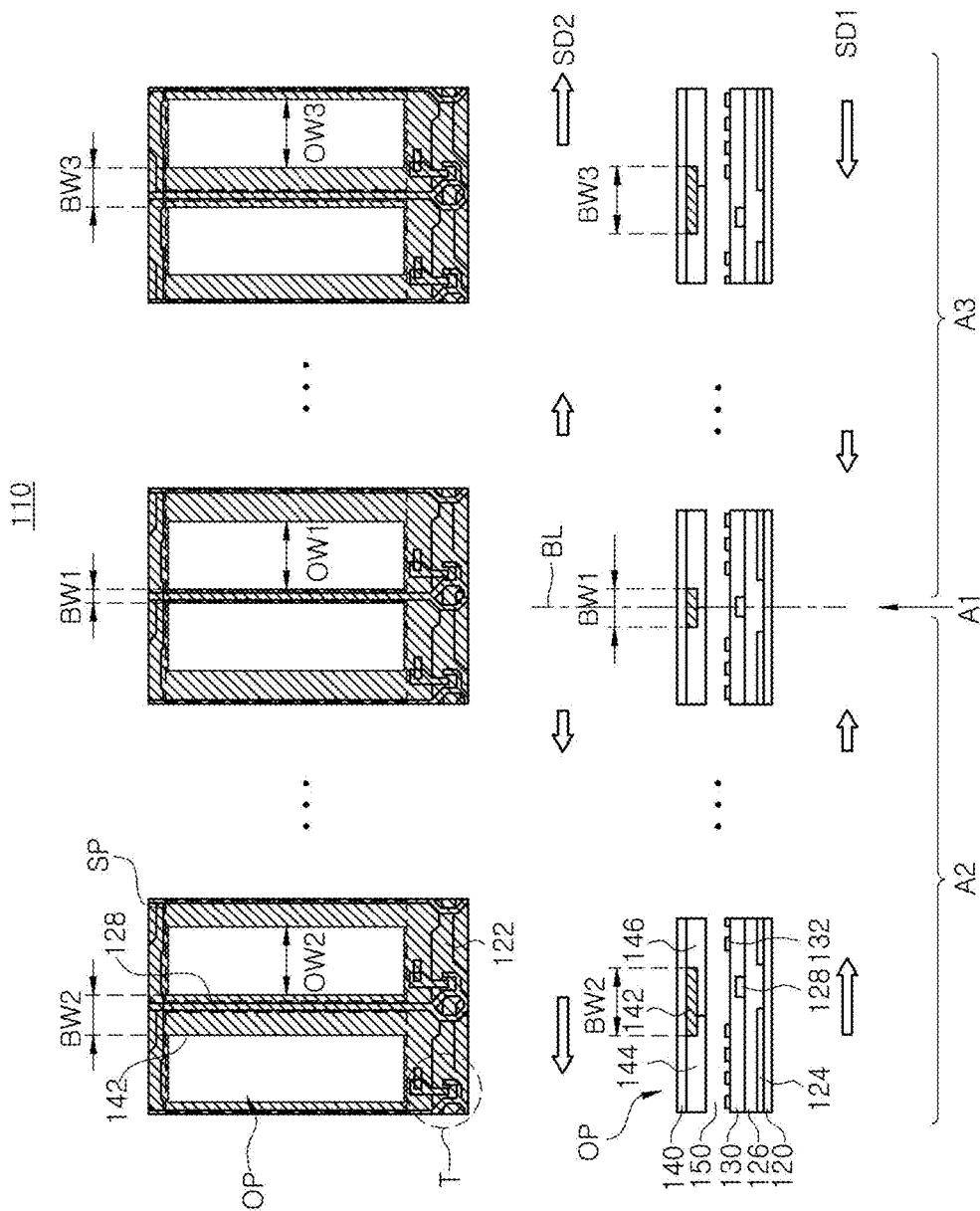
FIG. 3 is a view showing a plane surface and a cross-sectional surface of a curved display device according to the first embodiment of the present disclosure.

FIG. 2 is a cross-sectional view showing a curved shape and a stress of a curved display device according to a first embodiment of the present disclosure, and FIG. 3 is a view showing a plane surface and a cross-sectional surface of a curved display device according to the first embodiment of the present disclosure.

In FIG. 2, a curved display device 110 includes first and second substrates 120 and 140 facing each other and spaced apart from each other, a liquid crystal layer 150 between the first and second substrates 120 and 140, and a seal pattern 160 at an edge of the first and second substrates 120 and 140 for attaching the first and second substrates 120 and 140. Each of the first and second substrates 120 and 140 includes a plurality of sub-pixels SP displaying red, green, and blue colors.

The first and second substrates 120 and 140 have a curved surface of a concave shape toward an upper portion of the second substrate 140 where a user is located. Due to the curved shape, a tensile stress TS from a center to an edge is generated in an outer surface of the first substrate 120 and a compressive stress from an edge to a center is generated in an inner surface of the first substrate 120. In addition, a tensile stress from a center to an edge is generated in an inner surface of the second substrate 140, and a compressive stress CS from an edge to a center is generated in an outer surface of the second substrate 140.

A length of a long side of a horizontal direction of the inner surface of the first substrate 120 contracts forward a center by the compressive stress, and a length of a long side of a horizontal direction of the inner surface of the second substrate 140 expands toward an edge by the tensile stress. For obtaining an equal width of an open portion OP (of FIG. 3) and covering a data line 128 (of FIG. 3), a black matrix 142 (of FIG. 3) of the second substrate 140 has a first BM width BW1 (of FIG. 3) in a first panel portion A1 at a center of the first and second substrates 120 and 140 such that a center line of the black matrix 142 is aligned to a border line between first and second color filters 144 and 146 (of FIG. 3) and has second and third BM widths BW2 and BW3 (of FIG. 3) greater than the first BM width BW1 in second and third panel portions A2 and A3, respectively, such that the black matrix 142 of the first panel portion A1 uniformly extends toward a center of the second substrate 140 with respect to a border line between the first and second color filters 144 and 146.

In FIG. 3, the curved display device 110 includes the first and second substrates 120 and 140 and the liquid crystal layer 150 between the first and second substrates 120 and 140. Each of the first and second substrates 120 and 140 includes a plurality of sub-pixels SP displaying red, green and blue colors.

A gate line 122 is formed on an inner surface of the first substrate 120, and a gate insulating layer (not shown) is formed on the gate line 122. A common electrode 124 is formed on the gate insulating layer in each sub-pixel SP, and a first insulating layer 126 is formed on the common electrode 124. A data line 128 is formed on the first insulating layer 126 at a border between sub-pixels SP, and a second insulating layer 130 is formed on the data line 128.

The gate line 122 and the data line 128 cross each other to define a sub-pixel SP. A thin film transistor (TFT) T connected to the gate line 122 and the data line 128 is formed in each sub-pixel SP. A pixel electrode 132 is formed on the second insulating layer 130 in each sub-pixel SP.

A black matrix 142 is formed at a border between sub-pixels SP on an inner surface of the second substrate 140, and first and second color filters 144 and 146 are formed on the black matrix 142 in each sub-pixel SP. Although not shown, a third color filter may be further formed on the black matrix 142 in each sub-pixel SP, and the first, second and third color filters may constitute a color filter layer displaying red, green and blue colors, respectively. In another embodiment, the color filter layer may be formed on the inner surface of the first substrate 120. The black matrix 142 covers the gate line 122, the data line 128 and the TFT T and has an open portion OP exposing the sub-pixel SP.

The curved display device 110 has a curved surface of a concave shape toward an upper portion of the second substrate 140 where a user is located. Due to the curved shape, a compressive stress along a first shift direction SD1 from an edge to a center is generated in the inner surface of the first substrate 120, and a tensile stress along a second shift direction SD2 from the center to the edge is generated in the inner surface of the second substrate 140.

A length of the inner surface of the first substrate 120 contracts along the first shift direction SD1 by the compressive stress, and a length of the inner surface of the second substrate 140 expands along the second shift direction SD2 by the tensile stress. The black matrix 142 on the inner surface of the second substrate 140 covers the data line 128 of the first substrate 120 by inwardly extending the black matrix 142 (BW2, BW3) between open portions OP.

The first and second substrates 120 and 140 may be classified as a first panel portion A1 at the center and second and third panel portions A2 and A3 at both edges. In the first panel portion A1, a border line between the first and second color filters 144 and 146 is aligned to a central line of the data line 128 and a central line of the black matrix 142 is substantially aligned to the border line between the first and second color filters 144 and 146 such that the black matrix 142 covers the data line 128 and the open portion OP of the black matrix 142 exposes a central region of the sub-pixel SP. In the first panel portion A1, for example, the central line of the black matrix 142 and the border line between the first and second color filters 144 and 146 may be aligned to each other within an error range of about −3 μm to about +3 μm.

In the second and third panel portions A2 and A3, the border line between the first and second color filters 144 and 146 is shifted outwardly with respect to the central line of the data line 128 and the black matrix 142 inwardly extends as compared with the related art black matrix 42 (of FIG. 1) such that the central line of the black matrix 142 is disposed inside the border line between the first and second color filters 144 and 146. As a result, the black matrix 142 covers the data line 128 and the open portion OP of the black matrix 142 exposes the sub-pixel SP. Because light corresponding to a single data signal (a single gray level) applied to a single sub-pixel SP is emitted through a single color filter 144 or 146, a color mixing or a color crosstalk where the colors of the adjacent two sub-pixels SP are mixed is prevented and a display quality of an image displayed by the curved display device 110 is improved.

In the first panel portion A1, the black matrix 142 between the open portions OP has a first black matrix (BM) width BW1 and the open portion OP has a first open portion (OP) width OW1. In the second and third panel portions A2 and A3, the black matrix 142 between the open portions OP has second and third BM widths BW2 and BW3, respectively, and the open portion OP has second and third OP widths OW2 and OW3, respectively. Each of the second and third BM widths BW2 and BW3 is greater than the first BM width BW1 (BW2>BW1, BW3>BW1). The second and third BM widths BW2 and BW3 are equal to each other (BW2=BW3). Also, the first, second, and third OP widths OW1, OW2, and OW3 are equal to each other (OW1=OW2=OW3).

The black matrix 142 between the open portions OP in the second panel portion A2 has the second BM width BW2 to cover the data line 128 by extending a right side of the related art black matrix 42 (of FIG. 1) toward a center with respect to the border line between the first and second color filters 144 and 146. The black matrix 142 between the open portions OP in the third panel portion A3 has the third BM width BW3 to cover the data line 128 by extending a left side of the related art black matrix 42 (of FIG. 1) toward a center with respect to the border line between the first and second color filters 144 and 146.

In the curved display device 110, the open portion OP of the black matrix 142 has an equal width (OW1=OW2=OW3) throughout the whole of the first and second substrates 120 and 140, and the black matrix 142 in the second and third panel portions A2 and A3 has the second and third BM widths BW2 and BW3, respectively, greater than the first BM width BW1 (BW2=BW3>BW1) by inwardly extending the black matrix 142 toward the center as compared with the first panel portion A1. Accordingly, color mixing and color crosstalk are prevented, and image display quality is improved.

In another embodiment, a degree of design freedom may increase and an aperture ratio and a brightness may be improved by extending the black matrix in the second and third panel portions A2 and A3 differently by blocks.

Figure 4:
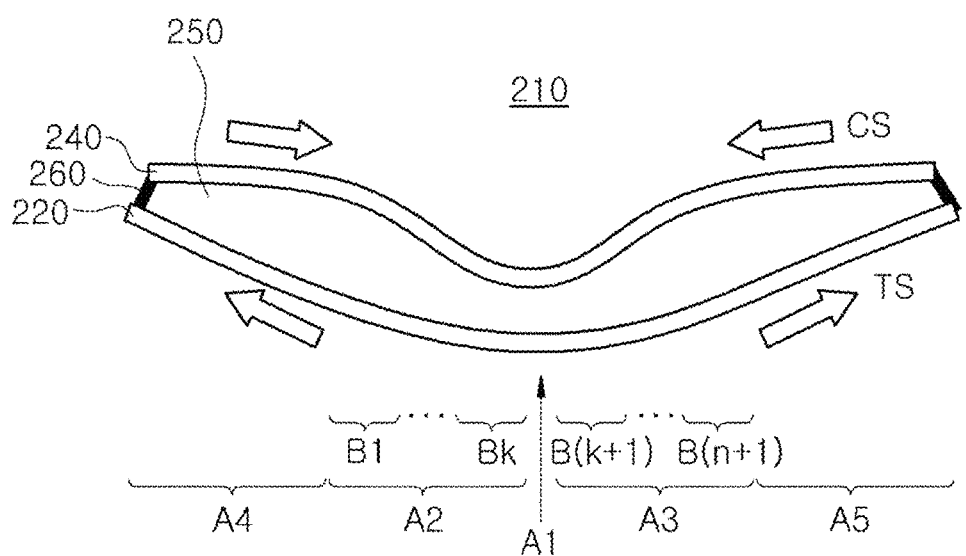
FIG. 4 is a cross-sectional view showing a curved shape and a stress of a curved display device according to a second embodiment of the present disclosure.
Figure 5:
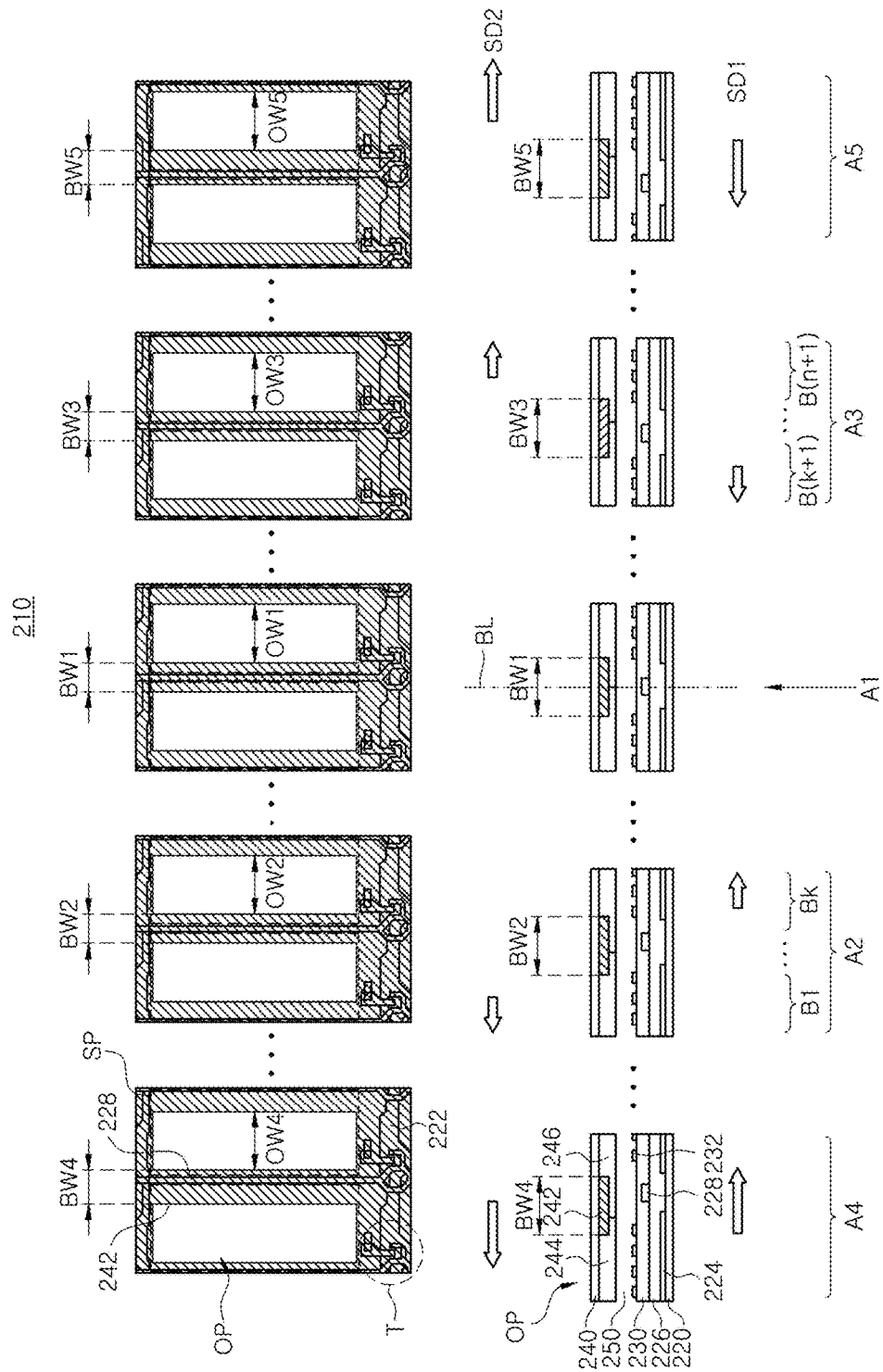
FIG. 5 is a view showing a plane surface and a cross-sectional surface of a curved display device according to the second embodiment of the present disclosure.

FIG. 4 is a cross-sectional view showing a curved shape and a stress of a curved display device according to a second embodiment of the present disclosure, and FIG. 5 is a view showing a plane surface and a cross-sectional surface of a curved display device according to the second embodiment of the present disclosure. An illustration for parts that are similar to those of the first embodiment will be omitted.

In FIG. 4, a curved display device 210 includes first and second substrates 220 and 240 facing and spaced apart from each other, a liquid crystal layer 250 between the first and second substrates 220 and 240 and a seal pattern 260 at an edge of the first and second substrates 220 and 240 for attaching the first and second substrates 220 and 240. Each of the first and second substrates 220 and 240 includes a plurality of sub-pixels SP displaying red, green, and blue colors.

The first and second substrates 220 and 240 have a curved surface of a concave shape toward an upper portion of the second substrate 240 where a user is located. A length of a long side of a horizontal direction of the inner surface of the first substrate 220 contracts forward of center by the compressive stress due to the curved shape, and a length of a long side of a horizontal direction of the inner surface of the second substrate 240 expands toward an edge by the tensile stress due to the curved shape.

For obtaining an equal width of an open portion OP (of FIG. 5) and covering a data line 228 (of FIG. 5), a black matrix 242 (of FIG. 5) of the second substrate 240 has a first BM width BW1 (of FIG. 5) in a first panel portion A1 at a center of the first and second substrates 220 and 240 such that the black matrix 242 extends toward an edge as compared with the related black matrix 42 (of FIG. 1). The black matrix 242 has second and third BM widths BW2 and BW3 (of FIG. 5) equal to or greater than the first BM width BW1 in second and third panel portions A2 and A3, respectively, having first to (n+1)th blocks B1 to B(n+1) such that the black matrix 242 of the first panel portion A1 extends toward a center and an edge of the second substrate 240 with respect to a border line between the first and second color filters 244 and 246 differently by blocks. The position of the black matrix 242 with respect to the border line between the first and second color filters 244 and 246 in the second and third panel portions A2 and A3 gradually changes. The black matrix 242 has fourth and fifth BM widths BW4 and BW5 (of FIG. 5) equal to or greater than the first BM width BW1 in fourth and fifth panel portions A4 and A5, respectively, outside the second and third panel portions A2 and A3 such that the black matrix 242 of the first panel portion A1 uniformly extends toward a center of the second substrate 240 with respect to the border line between the first and second color filters 244 and 246.

In FIG. 5, the curved display device 210 includes the first and second substrates 220 and 240 and the liquid crystal layer 250 between the first and second substrates 220 and 240. Each of the first and second substrates 220 and 240 includes a plurality of sub-pixels SP displaying red, green and blue colors.

A gate line 222 is formed on an inner surface of the first substrate 220, and a gate insulating layer (not shown) is formed on the gate line 222. A common electrode 224 is formed on the gate insulating layer in each sub-pixel SP, and a first insulating layer 226 is formed on the common electrode 224. A data line 228 is formed on the first insulating layer 226 at a border between sub-pixels SP, and a second insulating layer 230 is formed on the data line 228.

The gate line 222 and the data line 228 cross each other to define a sub-pixel SP, and a thin film transistor (TFT) T connected to the gate line 222 and the data line 228 is formed in each sub-pixel SP. A pixel electrode 232 is formed on the second insulating layer 230 in each sub-pixel SP.

A black matrix 242 is formed at a border between sub-pixels SP on an inner surface of the second substrate 240, and first and second color filters 244 and 246 are formed on the black matrix 242 in each sub-pixel SP. Although not shown, a third color filter may be further formed on the black matrix 242 in each sub-pixel SP, and the first, second and third color filters may constitute a color filter layer displaying red, green and blue colors, respectively. In another embodiment, the color filter layer may be formed on the inner surface of the first substrate 220. The black matrix 242 covers the gate line 222, the data line 228 and the TFT T and has an open portion OP exposing the sub-pixel SP.

The curved display device 210 has a curved surface of a concave shape toward an upper portion of the second substrate 240 where a user is located. Due to the curved shape, a compressive stress along a first shift direction SD1 from an edge to a center is generated in the inner surface of the first substrate 220, and a tensile stress along a second shift direction SD2 from the center to the edge is generated in the inner surface of the second substrate 240.

A length of the inner surface of the first substrate 220 contracts along the first shift direction SD1 due to the compressive stress, and a length of the inner surface of the second substrate 240 expands along the second shift direction SD2 due to the tensile stress. The black matrix 242 on the inner surface of the second substrate 240 covers the data line 228 of the first substrate 220 by extending the black matrix 242 (BW2, BW3) between the open portions OP of the second and third panel portions A2 and A3 differently by blocks and inwardly extending the black matrix 242 (BW4, BW5) between the open portions OP of the fourth and fifth panel portions A4 and A5.

The first and second substrates 220 and 240 may be classified as a first panel portion A1 at the center, second and third panel portions A2 and A3 at both sides of the first panel portion A1, a fourth panel portion A4 between the first and second panel portions A1 and A2, and a fifth panel portion A5 between the first and third panel portions A1 and A3. In the first panel portion A1, a border line between the first and second color filters 244 and 246 is aligned to a central line of the data line 228 and a central line of the black matrix 242 is aligned to the border line between the first and second color filters 244 and 246 such that the black matrix 242 covers the data line 228 and the open portion OP of the black matrix 242 exposes a central region of the sub-pixel SP. In the first panel portion A1, for example, the central line of the black matrix 242 and the border line between the first and second color filters 244 and 246 may be aligned to each other within an error range of about −3 μm to about +3 μm.

In the second and third panel portions A2 and A3, the border line between the first and second color filters 244 and 246 is shifted outwardly with respect to the central line of the data line 228 and the black matrix 242 extends forward the center and the edge differently by blocks such that the central line of the black matrix 242 is disposed inside the border line between the first and second color filters 244 and 246. As a result, the black matrix 242 covers the data line 228 and the open portion OP of the black matrix 242 exposes the sub-pixel SP.

In the fourth and fifth panel portions A4 and A5, the border line between the first and second color filters 244 and 246 is further shifted outwardly with respect to the central line of the data line 228 and the black matrix 242 inwardly extends such that the central line of the black matrix 242 is disposed inside the border line between the first and second color filters 244 and 246. As a result, the black matrix 242 covers the data line 228 and the open portion OP of the black matrix 242 exposes the sub-pixel SP.

Because light corresponding to a single data signal (a single gray level) applied to a single sub-pixel SP is emitted through a single color filter 244 or 246, color mixing or color crosstalk in which the colors of adjacent sub-pixels SP are mixed can be prevented, and image display quality displayed by the curved display device 210 is improved. In addition, because both sides of the black matrix 242 differently extend according to a shift magnitude, a degree of design freedom increases and an aperture ratio and a brightness are improved.

In the first panel portion A1, the black matrix 242 between the open portions OP has a first black matrix (BM) width BW1 and the open portion OP has a first open portion (OP) width OW1. In the second and third panel portions A2 and A3, the black matrix 242 between the open portions OP has second and third BM widths BW2 and BW3, respectively, and the open portion OP has second and third OP widths OW2 and OW3, respectively. A position of the black matrix 242 between the open portions OP in the second and third panel portions A2 and A3 changes by blocks. In the fourth and fifth BM widths BW4 and BW5, the black matrix 242 between the open portions OP has fourth and fifth BM widths BW4 and BW5, respectively, and the open portion OP has fourth and fifth OP widths OW4 and OW5, respectively. Each of the second to fifth BM widths BW2 to BW5 is equal to or greater than the first BM width BW1 (BW2>BW1, BW3>BW1, BW4>BW1, BW5>BW1), the second to fifth BM widths BW2 to BW5 are equal to each other (BW2=BW3=BW4=BW5), and the first to fifth OP widths OW1 to OW5 are equal to each other (OW1=OW2=OW3=OW4=OW5).

Each of the second to fifth BM widths BW2 to BW5 may be greater than the first BM width BW1 (BW2>BW1, BW3>BW1, BW4>BW1, BW5>BW1) when the first to (n+1)th blocks B1 to B(n+1) have an even number, and the second to fifth BM widths BW2 to BW5 may be equal to the first BM width BW1 (BW2=BW1, BW3=BW1, BW4=BW1, BW5=BW1) when the first to (n+1)th blocks B1 to B(n+1) have an odd number.

The black matrix 242 between the open portions OP in the second panel portion A2 has the second BM width BW2 to cover the data line 228 by extending a right and a left of the related art black matrix 42 (of FIG. 1) toward a center and an edge with respect to the border line between the first and second color filters 244 and 246. The left extension gradually increases and the right extension gradually decreases (i.e., the central line of the black matrix 242 is gradually further shifted toward the left with respect to the border line between the first and second color filters 244 and 246) from the fourth panel portion A4 to the first panel portion A1 (i.e., from the first block B1 to the kth block Bk). The black matrix 242 between the open portions OP in the third panel portion A3 has the third BM width BW3 to cover the data line 228 by extending a right side and a left side of the related art black matrix 42 (of FIG. 1) toward a center and an edge with respect to the border line between the first and second color filters 244 and 246. The right extension gradually increases and the left extension gradually decreases (i.e., the central line of the black matrix 242 is gradually further shifted toward the right with respect to the border line between the first and second color filters 244 and 246) from the fifth panel portion A5 to the first panel portion A1 (i.e., from the (n+1)th block B(n+1) to the (k+1)th block B(k+1)).

In addition, the black matrix 242 between the open portions OP in the fourth panel portion A4 has the fourth BM width BW4 to cover the data line 228 by extending a right of the related art black matrix 42 (of FIG. 1) toward a center with respect to the border line between the first and second color filters 244 and 246. The black matrix 242 between the open portions OP in the fifth panel portion A5 has the fifth BM width BW5 to cover the data line 228 by extending a left of the related art black matrix 42 (of FIG. 1) toward a center with respect to the border line between the first and second color filters 244 and 246.

For example, the second panel portion A2 may be classified into the first to kth blocks B1 to Bk. In the first to kth blocks B1 to Bk, the black matrix 242 between the open portions OP has the second BM width BW2 and the central line of the black matrix 242 is disposed inside the border line between the first and second color filters 244 and 246. Because the central line of the black matrix 242 is gradually further shifted to the left with respect to the border line between the first and second color filters 244 and 246 from the first block B1 to the kth block Bk, the central line of the black matrix 242 is disposed closer to the border line between the first and second color filters 244 and 246 from the first block B1 to the kth block Bk.

In addition, the third panel portion A3 may be classified into the (k+1)th to (n+1)th blocks B(k+1) to B(n+1). In the (k+1)th to (n+1)th blocks B(k+1) to B(n+1), the black matrix 242 between the open portions OP has the third BM width BW3 and the central line of the black matrix 242 is disposed inside the border line between the first and second color filters 244 and 246. Since the central line of the black matrix 242 is gradually further shifted to the right with respect to the border line between the first and second color filters 244 and 246 from the (k+1)th to (n+1)th blocks B(k+1) to B(n+1), the central line of the black matrix 242 is disposed closer to the border line between the first and second color filters 244 and 246 from the (k+1)th to (n+1)th blocks B(k+1) to B(n+1).

In the curved display device 210 according to the second embodiment of the present disclosure, the open portion OP of the black matrix 242 has an equal width (OW1=OW2=OW3=OW4=OW5) throughout the whole of the first and second substrates 220 and 240. The black matrix 242 in the second and third panel portions A2 and A3 has the second and third BM widths BW2 and BW3, respectively, equal to or greater than the first BM width BW1 (BW2=BW3>BW1) and has different positions with respect to the border line between the first and second color filters 244 and 246 by blocks by extending the right and the left of the black matrix 142 toward the center and the edge differently by blocks as compared with the first panel portion A1. The black matrix 242 in the fourth and fifth panel portions A4 and A5 has the fourth and fifth BM widths BW4 and BW5, respectively, equal to or greater than the first BM width BW1 (BW4=BW5>BW1) by inwardly extending the black matrix 142 toward the center as compared with the first panel portion A1. Accordingly, color mixing and color crosstalk are prevented, and image display quality is improved.

Although the curved display device 210 includes the fourth and fifth panel portions A4 and A5 disposed outside the second and third panel portions A2 and A3 in the second embodiment, the curved display device may include the first panel portion at a center and second and third panel portions, where a relative position of the black matrix gradually changes, at both sides of the first panel portion in another embodiment.

Figure 6:
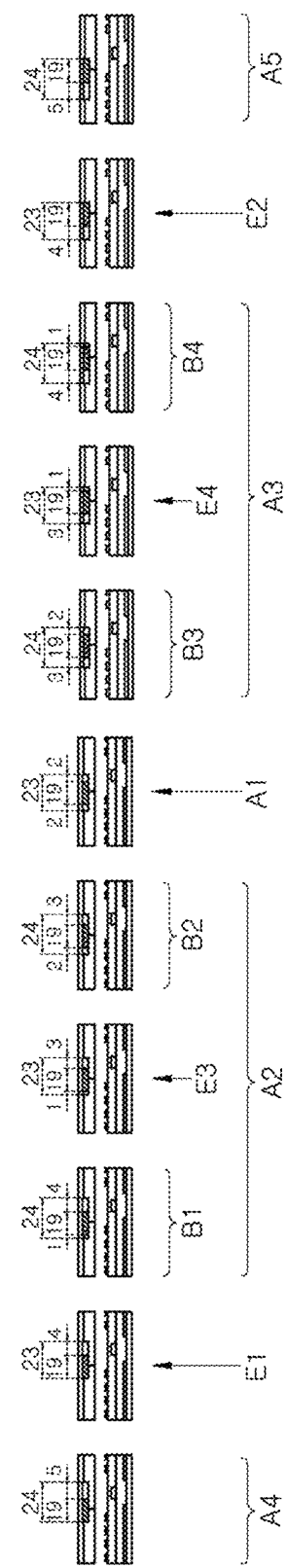
FIG. 6 is a cross-sectional view showing a curved display device having four blocks according to the second embodiment of the present disclosure.
Figure 7:
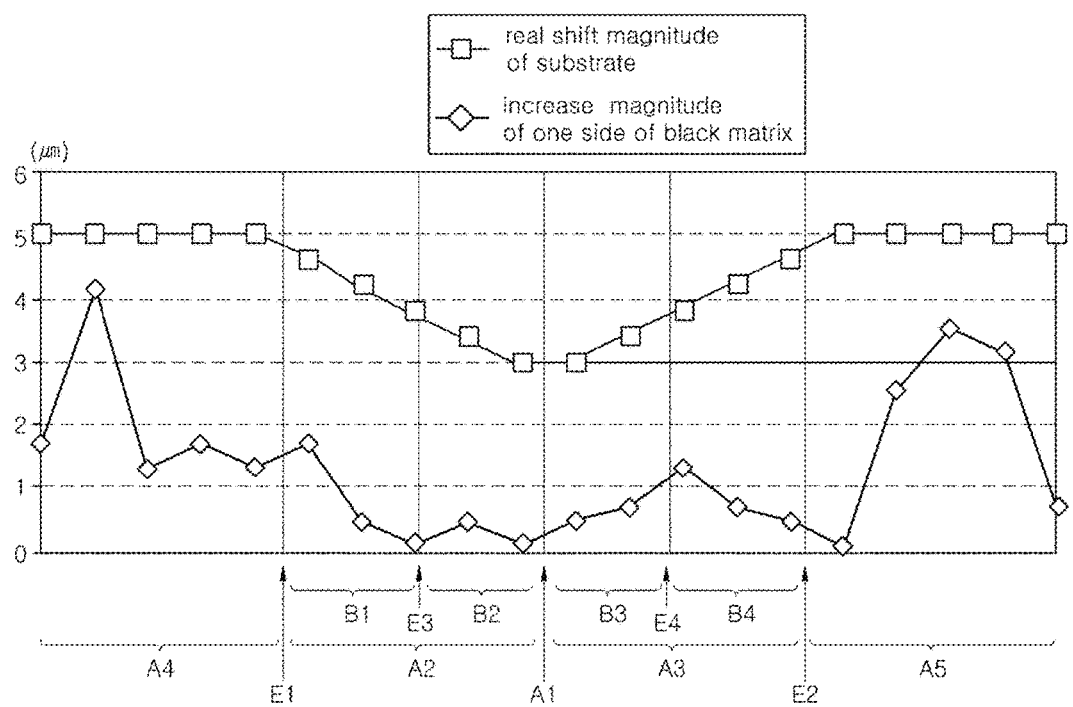
FIG. 7 is a graph showing a shift magnitude and an increase magnitude of a black matrix of a curved display device of FIG. 6.

A width and a position of the black matrix in the curved display device 210 according to the second embodiment will be illustrated. FIG. 6 is a cross-sectional view showing a curved display device having four blocks according to the second embodiment of the present disclosure, and FIG. 7 is a graph showing a shift magnitude and an increase magnitude of a black matrix of a curved display device of FIG. 6.

In FIG. 6, the curved display device includes the first panel portion A1 at a center, the second and third panel portions A2 and A3 at both sides of the first panel portion A1, and the fourth and fifth panel portions A4 and A5 outside the second and third panel portions A2 and A3. The second panel portion A2 includes the first and second blocks B1 and B2, and the third panel portion A3 includes the third and fourth blocks B3 and B4.

A first border portion E1 is disposed between the fourth and second panel portions A4 and A2, and a second border portion E2 is disposed between the third and fifth panel portions A3 and A5. A third border portion E3 is disposed between the first and second blocks B1 and B2, and a fourth border portion E4 is disposed between the third and fourth blocks B3 and B4. The black matrix 242 of the first to fourth border portions E1 to E4 may have a smaller width than the black matrix 242 of the adjacent panel portion or the adjacent block such that the open portion OP has the equal width. Accordingly, a user does not recognize a change of the width of the black matrix 242 and a change of the relative position of the open portion OP, thereby improving image display quality. Because the first to fourth blocks B1 to B4 has an even number, the first panel portion A1 functions as a border area between the second and third blocks B2 and B3, and the first BM width BW1 of the black matrix 242 of the first panel portion A1 is smaller than each of the second to fifth BM width BW2 to BW5.

In another embodiment where the plurality of blocks has an odd number, the first panel portion A1 functions as a block, and the first BM width BW1 of the black matrix 242 of the first panel portion A1 may be equal to each of the second to fifth BM widths BW2 to BW5.

In addition, the first panel portion A1 may correspond to the central line of the first and second substrates 220 and 240, and the fourth, second, third and fifth panel portions A4, A2, A3 and A5 may correspond to a quarter (1/4), two quarters (2/4), three quarters (3/4) and four quarters (4/4), respectively, of the first and second substrates 220 and 240 from the left. For example, the black matrix 242 of the first panel portion A1 may have the first BM width BW1 of about 23 μm such that the right side and the left side of the black matrix 242 extend by about 2 μm as compared with the related art black matrix 42 (of FIG. 1) having a width of about 19 μm (the central line of the black matrix 242 coincides with the border line between the first and second color filters 244 and 246).

The black matrix 242 of the first block B1 of the second panel portion A2 may have the second BM width BW2 of about 24 μm such that the left and the right of the black matrix 242 extend by about 1 μm toward the edge and about 4 μm toward the center, respectively, as compared with the related art black matrix 42 (of FIG. 1) having a width of about 19 μm (the central line of the black matrix 242 is disposed at the right of about 1.5 μm of the border line between the first and second color filters 244 and 246). The black matrix 242 of the second block B2 of the second panel portion A2 may have the second BM width BW2 of about 24 μm such that the left and the right of the black matrix 242 extend by about 2 μm toward the edge and about 3 μm toward the center, respectively, as compared with the related art black matrix 42 (of FIG. 1) having a width of about 19 μm (the central line of the black matrix 242 is disposed at the right of about 0.5 μm of the border line between the first and second color filters 244 and 246).

The black matrix 242 of the third block B3 of the third panel portion A3 may have the third BM width BW3 of about 24 μm such that the right and the left of the black matrix 242 extend by about 2 μm toward the edge and about 3 μm toward the center, respectively, as compared with the related art black matrix 42 (of FIG. 1) having a width of about 19 μm (the central line of the black matrix 242 is disposed at the left of about 0.5 μm of the border line between the first and second color filters 244 and 246). The black matrix 242 of the fourth block B4 of the third panel portion A3 may have the third BM width BW3 of about 24 μm such that the right and the left of the black matrix 242 extend by about 1 μm toward the edge and about 4 μm toward the center, respectively, as compared with the related art black matrix 42 (of FIG. 1) having a width of about 19 μm (the central line of the black matrix 242 is disposed at the left of about 1.5 μm of the border line between the first and second color filters 244 and 246).

The black matrix 242 of the first border portion E1 may have a width of about 23 μm such that the right of the black matrix 242 extend by about 4 μm toward the center as compared with the related art black matrix 42 (of FIG. 1) having a width of about 19 μm (the central line of the black matrix 242 is disposed at the right of about 2 μm of the border line between the first and second color filters 244 and 246). The black matrix 242 of the second border portion E2 may have a width of about 23 μm such that the left of the black matrix 242 extend by about 4 μm toward the center as compared with the related art black matrix 42 (of FIG. 1) having a width of about 19 μm (the central line of the black matrix 242 is disposed at the left of about 2 μm of the border line between the first and second color filters 244 and 246).

The black matrix 242 of the third border portion E3 may have a width of about 23 μm such that the left and the right of the black matrix 242 extend by about 1 μm toward the edge and about 3 μm toward the center, respectively, as compared with the related art black matrix 42 (of FIG. 1) having a width of about 19 μm (the central line of the black matrix 242 is disposed at the right of about 1 μm of the border line between the first and second color filters 244 and 246). The black matrix 242 of the fourth border portion E4 may have a width of about 23 μm such that the right and the left of the black matrix 242 extend by about 1 μm toward the edge and about 3 μm toward the center, respectively, as compared with the related art black matrix 42 (of FIG. 1) having a width of about 19 μm (the central line of the black matrix 242 is disposed at the left of about 1 μm of the border line between the first and second color filters 244 and 246).

The black matrix 242 of the fourth panel portion A4 may have the second BM width BW2 of about 24 μm such that the right of the black matrix 242 extend by about 5 μm toward the center as compared with the related art black matrix 42 (of FIG. 1) having a width of about 19 μm (the central line of the black matrix 242 is disposed at the right of about 2.5 μm of the border line between the first and second color filters 244 and 246). The black matrix 242 of the fifth panel portion A5 may have the third BM width BW3 of about 24 μm such that the left of the black matrix 242 extend by about 5 μm toward the center as compared with the related art black matrix 42 (of FIG. 1) having a width of about 19 μm (the central line of the black matrix 242 is disposed at the left of about 2.5 μm of the border line between the first and second color filters 244 and 246).

In FIG. 7, when the first and second substrates 220 and 240 have the curved shape, the first and second substrates 220 and 240 have a shift magnitude of about 0.5 μm in the first panel portion A1, a shift magnitude of about 0.1 μm to about 1.8 μm in the second and third panel portions A2 and A3, and a shift magnitude of about 0.1 μm to about 4.2 μm in the fourth and fifth panel portions A4 and A5. Specifically, the first and second substrates 220 and 240 have a shift magnitude of about 0.1 μm to about 1.8 μm in the first and fourth blocks B1 and B4 and a shift magnitude of about 0.1 μm to about 1.4 μm in the second and third blocks B2 and B3.

For compensating the real shift magnitude due to the curved shape by the one-directional extension of the first embodiment, one side of the black matrix 142 extends by about 5 μm or more throughout the whole of the first and second substrates 120 and 140 as compared with the related art black matrix 42 (of FIG. 1). However, in the second embodiment, the black matrix 242 inwardly extends by about 5 μm toward the center in the fourth and fifth panel portions A4 and A5 where the relatively great real shift magnitude occurs. In addition, the black matrix 242 outwardly and inwardly extends by about 1 μm to about 4 μm toward the edge and the center in the second and third panel portions A2 and A3 where the relatively small real shift magnitude occurs. Because the position of the central line of the black matrix 242 with respect to the border line of the first and second color filters 244 and 246 is changed by blocks based on the real shift magnitude in the first to fourth blocks B1 to B4, the reduction in an aperture ratio due to the extension of the black matrix 242 is minimized and the real shift magnitude due to the curved shape is completely compensated.

Further, the open portions OP has an equal width through the whole of the curved display device 210 by forming the black matrix 242 of the first to fourth border portions E1 to E4 to have a width smaller than a width of the black matrix 242 of the second to fourth panel portions A2 to A4. As a result, a user does not recognize a change of the width of the black matrix 242 and a change of the relative position of the open portion OP. Thus, visibility and image display quality is improved. The maximum shift magnitude of the curved display device may be calculated based on the horizontal length, the thickness, the radius of curvature and the cell gap of the substrate.

Figure 8A:
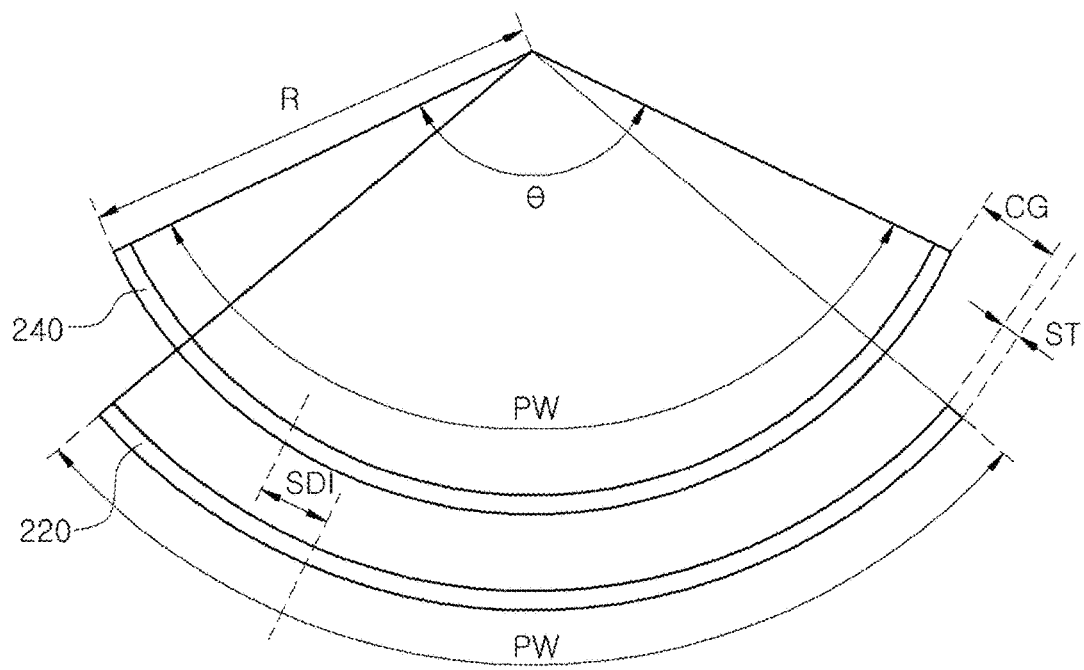
FIG. 8A is a cross-sectional view showing a curved display device without a seal pattern according to the second embodiment of the present disclosure.
Figure 8B:
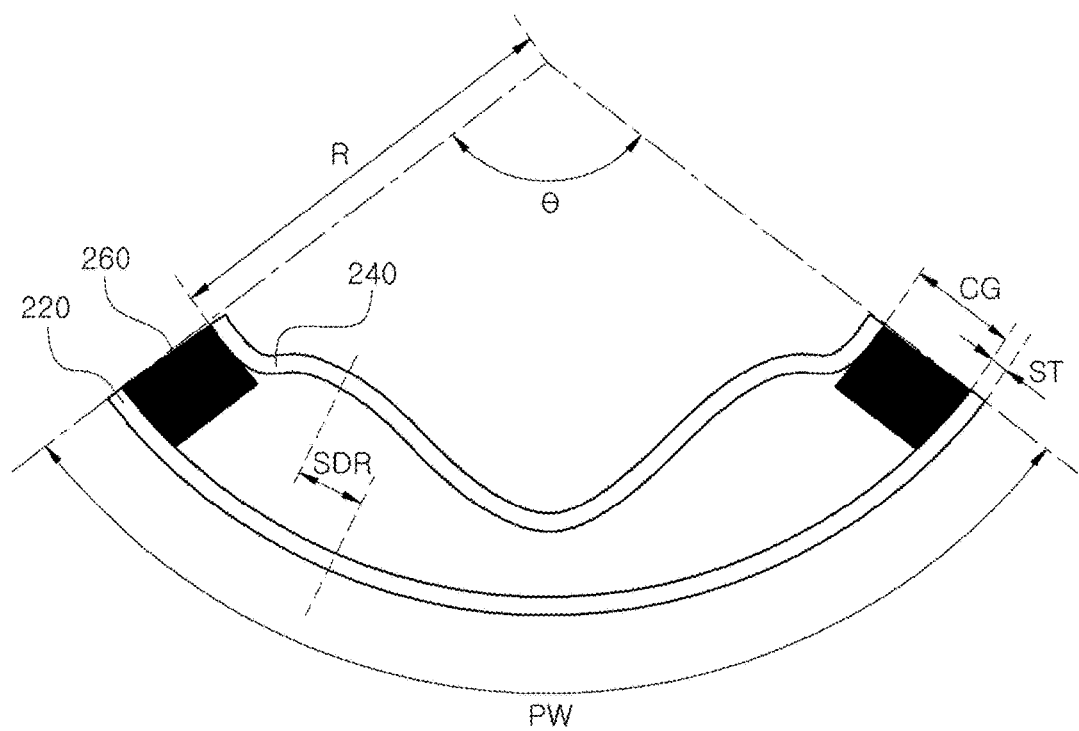
FIG. 8B is a cross-sectional view showing a curved display device including a seal pattern according to the second embodiment of the present disclosure.
Figure 8C:
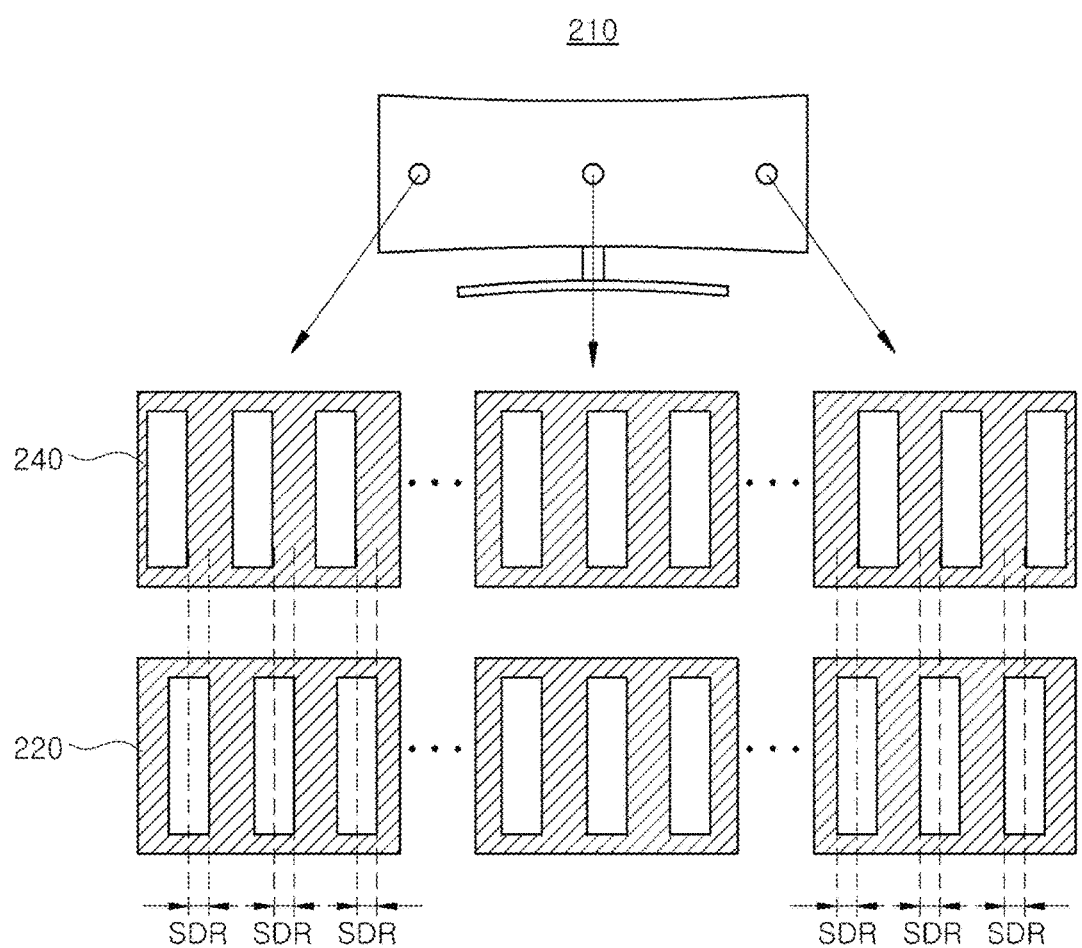
FIG. 8C is an exploded view showing a maximum shift magnitude in a curved display device according to the second embodiment of the present disclosure.

FIG. 8A is a cross-sectional view showing a curved display device without a seal pattern according to the second embodiment of the present disclosure, FIG. 8B is a cross-sectional view showing a curved display device including a seal pattern according to the second embodiment of the present disclosure, and FIG. 8C is an exploded view showing a maximum shift magnitude in a curved display device according to the second embodiment of the present disclosure.

In FIG. 8A, when the curved shape having a radius of curvature R and a curved angle θ is applied to the first and second substrates 220 and 240 having a width PW along a horizontal direction, a thickness ST and a cell gap CG in a plane shape, an ideal maximum shift magnitude SDI of the first and second substrates 220 and 240 without a seal pattern may be calculated according to the following equation 1.

$$SDI = [PW - 2\pi(R + CG + ST)*(\theta/360°)] \quad \text{equation 1}$$

In FIG. 8B, when a seal pattern 260 is formed at an edge between the first and second substrates 220 and 240, a real maximum shift magnitude SDR is smaller than the ideal maximum shift magnitude SDI, and the real maximum shift magnitude SDT may be calculated using a correction coefficient α greater than 0 and smaller than 1 according to the following equation 2.

$$SDR = (\alpha * SDI), (0 < \alpha < 1) \quad \text{equation 2}$$

In FIG. 8C, while the sub-pixel SP of the second substrate 240 corresponding to the open portion OP of the black matrix 242 coincides with the sub-pixel SP of the first substrate 220 having the TFT T at the center of the first and second substrates 220 and 240, the sub-pixel SP of the second substrate 240 corresponding to the open portion OP of the black matrix 242 is outwardly shifted toward the edge by the maximum shift magnitude SDR with respect to the sub-pixel SP of the first substrate 220 having the TFT T at the edge of the first and second substrates 220 and 240.

Figure 9:
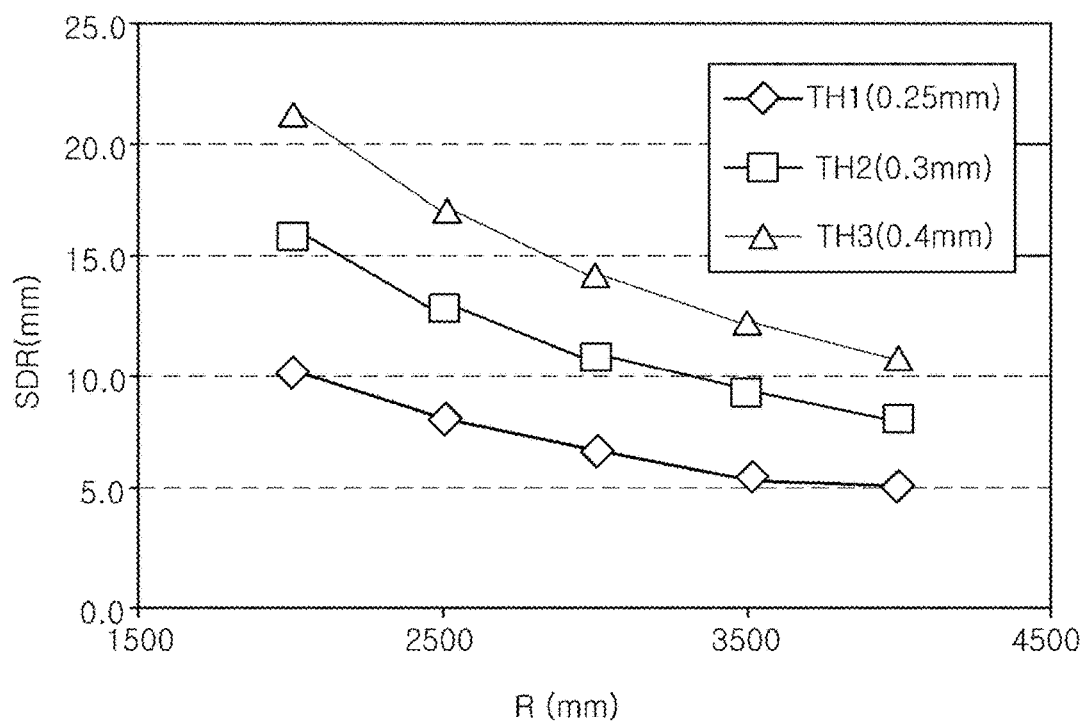
FIG. 9 is a graph showing a substrate thickness and a maximum shift magnitude with respect to a radius of curvature of a curved display device according to the second embodiment of the present disclosure.

FIG. 9 is a graph showing a substrate thickness and a maximum shift magnitude with respect to a radius of curvature of a curved display device according to the second embodiment of the present disclosure.

In FIG. 9, as a thickness of first and second substrates 220 and 240 of the curved display device 210 according to the second embodiment of the present disclosure increases from about 0.25 mm to about 4 mm, the real maximum shift magnitude SDR increases. In addition, as the radius of curvature R of the curved shape increases, the real maximum shift magnitude SDR decreases.

Figure 10:
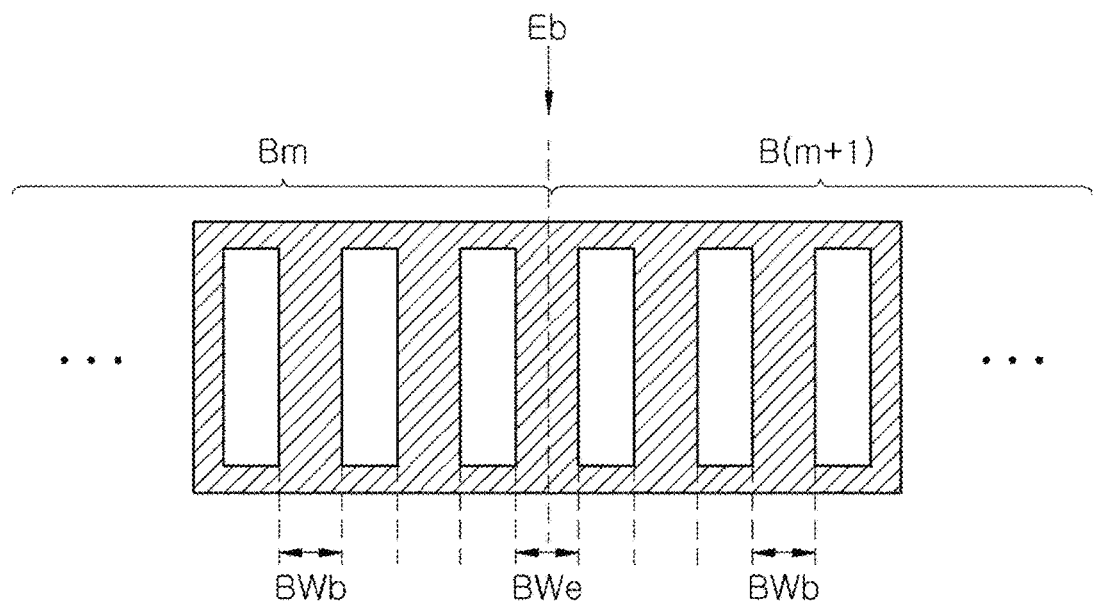
FIG. 10 is a view showing a plurality of blocks of a curved display device according to the second embodiment of the present disclosure.

A method of determining a plurality of blocks using the maximum shift magnitude SDR will be illustrated hereinafter. FIG. 10 is a view showing a plurality of blocks of a curved display device according to the second embodiment of the present disclosure.

In FIG. 10, the two quarters and the three quarters from the left of the first and second substrates 220 and 240 may be classified into the first to (n+1)th blocks B1 to B(n+1). When the first and second substrates 220 and 240 have the curved shape, the maximum shift magnitude SDR may be calculated using the correction coefficient α, the width PW of the substrate, the cell gap CG, the radius of curvature R and the curved angle θ according to the above equations 1 and 2.

The BM movement magnitude BS may be determined within a range according to the following equation 5 so that the change between the block BM width BWb and the border BM width BWe cannot be recognized.

$$(0.7/1) \leq (BWb/BWe) \leq (1/0.7) \qquad \text{equation 5}$$

TABLE 1 shows a number (n+1) of a plurality of blocks based on a radius of curvature R, a substrate thickness ST and a maximum shift magnitude SDR of a curved display device according to a second embodiment of the present disclosure.

TABLE 1

| radius of curvature (R) (mm) | substrate thickness (ST): 0.25 mm | | substrate thickness (ST): 0.3 mm | | substrate thickness (ST): 0.4 mm | |
| --- | --- | --- | --- | --- | --- | --- |
| | maximum shift magnitude (SDR) (mm) | number of blocks (n + 1) | maximum shift magnitude (SDR) (mm) | number of blocks (n + 1) | maximum shift magnitude (SDR) (mm) | number of blocks (n + 1) |
| 2000 | 10.00 | 11 | 15.9 | 17 | 21.2 | 23 |
| 2500 | 7.97 | 9 | 12.8 | 14 | 16.9 | 18 |
| 3000 | 6.64 | 8 | 10.6 | 12 | 14.1 | 16 |
| 3500 | 5.47 | 7 | 9.1 | 11 | 12.2 | 14 |
| 4000 | 5.00 | 6 | 8.0 | 9 | 10.6 | 12 |

The first to (n+1)th blocks B1 to B(n+1) may be determined according to the maximum shift magnitude SDR and a movement magnitude of the relative position of the central line of the black matrix 242. In addition, a plurality of border portions may be determined between the blocks so that the change of the central line of the black matrix 242 with respect to the border line between the first and second color filters 244 and 246 cannot be recognized.

The number (n+1) of the plurality of blocks may be determined such that the position of the central line of the black matrix 242 gradually changes with respect to the border line between the first and second color filters 244 and 246. The number of the plurality of border portions may be determined as a value greater than 0 and smaller than n based on the following condition. The width of the black matrix in the plurality of border portions may be determined smaller than the width of the black matrix in the plurality of blocks.

For example, when the black matrix 242 in the mth and (m+1)th blocks Bm and B(m+1) has an equal block BM width BWb (BWb=one of BW2 to BW5) and the positions of the central lines of the black matrix 242 in the mth and (m+1)th blocks Bm and B(m+1) change with respect to the border line between the first and second color filters 244 and 246 by a BM movement magnitude BS, the number (n+1) of the first to (n+1)th blocks B1 to B(n+1) may be calculated by obtaining n according to the following equation 3.

$$n = (SDR/BS) \qquad \text{equation 3}$$

When n is a decimal, n may be rounded up to an integer.

The black matrix 242 in a border portion Eb between the mth and (m+1)th blocks Bm and B(m+1) may be determined to have a border BM width BWe smaller than the block BM width BWb (BWe<BWb) according to the following equation 4

$$BWe = (BWb - BS) \qquad \text{equation 4}$$

In TABLE 1, the number (n+1) of the first to (n+1)th blocks B1 to B(n+1) of the curved display device 210 according to the second embodiment of the present disclosure may be determined according to the radius of curvature R of the curved shape, the thickness ST of the first and second substrates 220 and 240 and the real maximum shift magnitude SDR between the first and second substrates 220 and 240. As the radius of curvature R decreases, the substrate thickness ST increases and the maximum shift magnitude SDR increases, the number (n+1) of the first to (n+1)th blocks B1 to B(n+1) increases.

The border portion Eb may be disposed between the first to (n+1)th blocks B1 to B(n+1) according to the equation 3. Because the border portion is determined so that the change of the position of the black matrix 242 and the open portion OP between the plurality of blocks cannot be recognized, image display quality is improved.

In another embodiment, the whole of the plurality of sub-pixels may have the same property by increasing the widths of the black matrix and the data line at the center.

Figure 11:
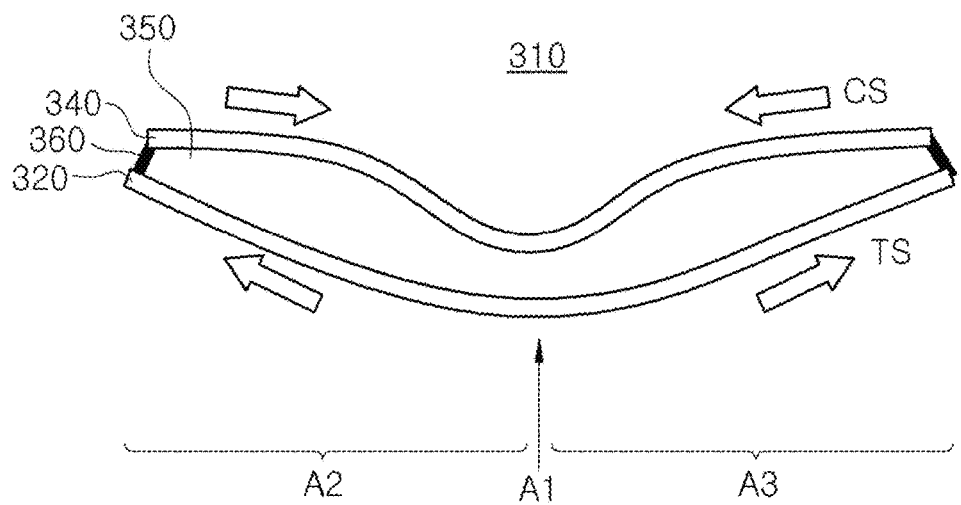
FIG. 11 is a cross-sectional view showing a curved shape and a stress of a curved display device according to a third embodiment of the present disclosure.
Figure 12:
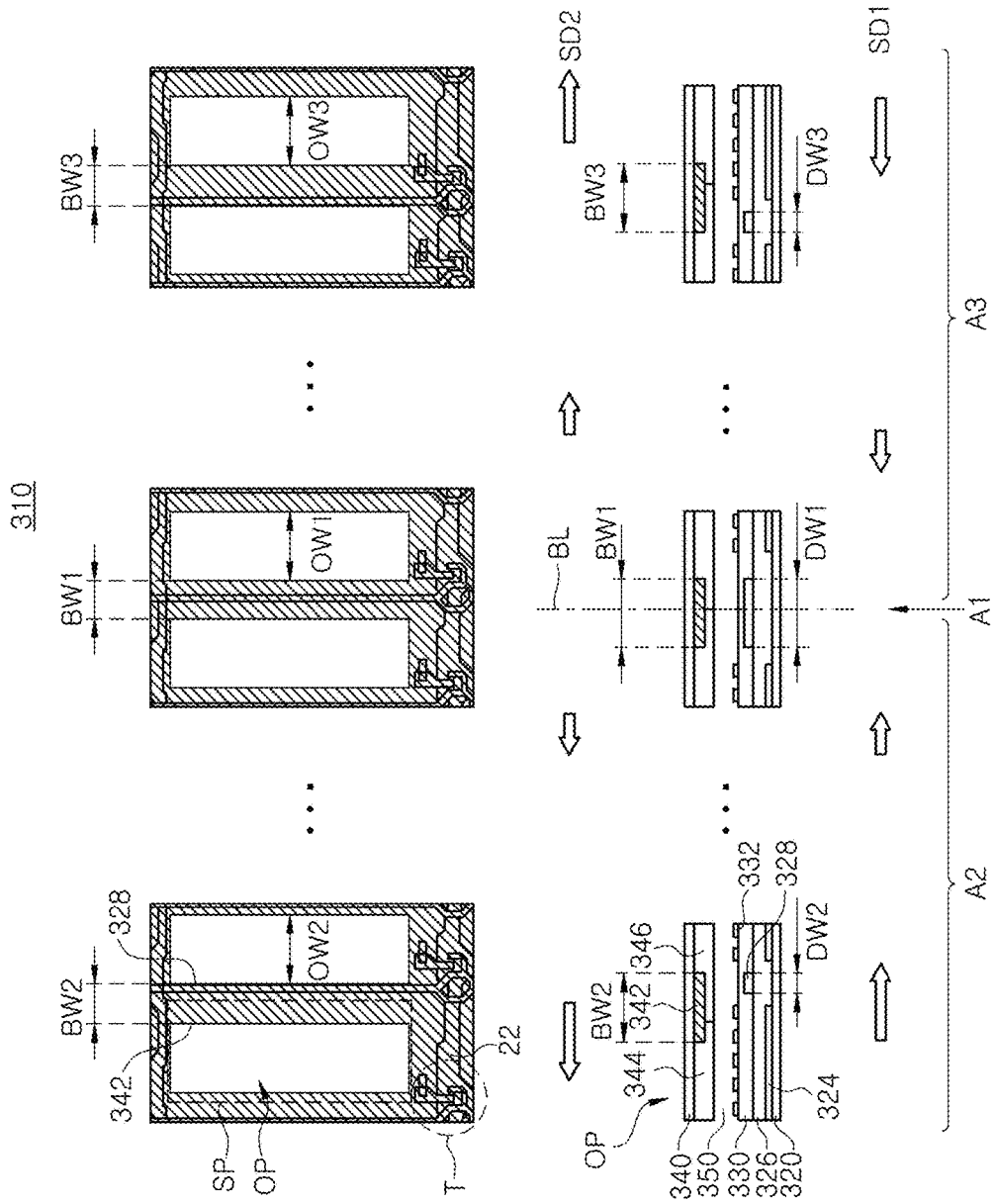
FIG. 12 is a view showing a plane surface and a cross-sectional surface of a curved display device according to the third embodiment of the present disclosure.

FIG. 11 is a cross-sectional view showing a curved shape and a stress of a curved display device according to a third embodiment of the present disclosure, and FIG. 12 is a view showing a plane surface and a cross-sectional surface of a curved display device according to the third embodiment of the present disclosure.

In FIG. 11, a curved display device 310 according to the third embodiment of the present disclosure includes first and second substrates 320 and 340 facing and spaced apart from each other, a liquid crystal layer 350 between the first and second substrates 320 and 340 and a seal pattern 360 at an edge of the first and second substrates 320 and 340 for attaching the first and second substrates 320 and 340. Each of the first and second substrates 320 and 340 includes a plurality of sub-pixels SP displaying red, green and blue colors.

The first and second substrates 320 and 340 have a curved surface of a concave shape toward an upper portion of the second substrate 340 where a user is located. Due to the curved shape, a tensile stress TS from a center to an edge is generated in an outer surface of the first substrate 320 and a compressive stress from an edge to a center is generated in an inner surface of the first substrate 320. In addition, a tensile stress from a center to an edge is generated in an inner surface of the second substrate 340, and a compressive stress CS from an edge to a center is generated in an outer surface of the second substrate 340.

A length of a long side of a horizontal direction of the inner surface of the first substrate 320 contracts forward a center by the compressive stress, and a length of a long side of a horizontal direction of the inner surface of the second substrate 340 expands toward an edge by the tensile stress. For obtaining an equal width of an open portion OP (of FIG. 12) and covering a data line 328 (of FIG. 12), a black matrix 342 (of FIG. 12) of the second substrate 340 has a first BM width BW1 (of FIG. 12) in a first panel portion A1 at a center of the first and second substrates 320 and 340 such that a center line of the black matrix 342 coincides with a border line between first and second color filters 344 and 346 (of FIG. 12) and has second and third BM widths BW2 and BW3 (of FIG. 12) equal to the first BM width BW1 in second and third panel portions A2 and A3, respectively, such that the black matrix 342 of the first panel portion A1 uniformly moves toward a center of the second substrate 340 with respect to a border line between the first and second color filters 344 and 346.

In addition, the data line 328 of the first substrate 320 has a first data line (DL) width DW1 equal to the first BM width BW1 of the black matrix 342 in the first panel portion A1 such that both sides of the data line 328 coincide with both sides of the black matrix 342 and has second and third DL widths DW2 and DW3 smaller than the second and third BM widths BW2 and BW3 in the second and third panel portions A2 and A3, respectively, such that the data line 328 is completely covered with the black matrix 342.

In FIG. 12, the curved display device 310 includes the first and second substrates 320 and 340 and the liquid crystal layer 350 between the first and second substrates 320 and 340. Each of the first and second substrates 320 and 340 includes a plurality of sub-pixels SP displaying red, green, and blue colors.

A gate line 322 is formed on an inner surface of the first substrate 320, and a gate insulating layer (not shown) is formed on the gate line 322. A common electrode 324 is formed on the gate insulating layer in each sub-pixel SP, and a first insulating layer 326 is formed on the common electrode 324. A data line 328 is formed on the first insulating layer 326 at a border between sub-pixels SP, and a second insulating layer 330 is formed on the data line 328.

The gate line 322 and the data line 328 cross each other to define the sub-pixel SP, and a thin film transistor (TFT) T connected to the gate line 322 and the data line 328 is formed in each sub-pixel SP. A pixel electrode 332 is formed on the second insulating layer 330 in each sub-pixel SP.

A black matrix 342 is formed at a border between sub-pixels SP on an inner surface of the second substrate 340, and first and second color filters 344 and 346 are formed on the black matrix 342 in each sub-pixel SP. Although not shown, a third color filter may be further formed on the black matrix 342 in each sub-pixel SP, and the first, second and third color filters may constitute a color filter layer displaying red, green and blue colors, respectively. In another embodiment, the color filter layer may be formed on the inner surface of the first substrate 320. The black matrix 342 covers the gate line 322, the data line 328 and the TFT T and has an open portion OP exposing the sub-pixel SP.

The curved display device 310 has a curved surface of a concave shape toward an upper portion of the second substrate 340 where a user is located. Due to the curved shape, a compressive stress along a first shift direction SD1 from an edge to a center is generated in the inner surface of the first substrate 320, and a tensile stress along a second shift direction SD2 from the center to the edge is generated in the inner surface of the second substrate 340.

A length of the inner surface of the first substrate 320 contracts along the first shift direction SD1 by the compressive stress, and a length of the inner surface of the second substrate 340 expands along the second shift direction SD2 by the tensile stress. The black matrix 342 on the inner surface of the second substrate 340 covers the data line 328 of the first substrate 320 with an equal width by extending both sides or one side of the black matrix 342 (BW1, BW2, BW3) between open portions OP. In addition, the plurality of sub-pixels SP have an equal disclination state by extending a width of the data line 328 at the center.

The first and second substrates 320 and 340 may be classified as a first panel portion A1 at the center and second and third panel portions A2 and A3 at both edges. In the first panel portion A1, a border line between the first and second color filters 344 and 346 is aligned to a central line of the data line 328 and a central line of the black matrix 342 substantially coincides with the border line between the first and second color filters 344 and 346 by extending both sides of the black matrix 342 equally as compared with the related art black matrix 42 (of FIG. 1) such that the black matrix 342 covers the data line 328 and the open portion OP of the black matrix 342 exposes a central region of the sub-pixel SP.

In the first panel portion A1, for example, the first BM width BW1 of the black matrix 342 may be the same as the first DL width DW1 of the data line 328 (BW1=DW1) such that both sides of the data line 328 coincides with both sides of the black matrix 342, respectively. The central line of the black matrix 342 and the border line between the first and second color filters 344 and 346 may be aligned to each other within an error range of about −3 μm to about +3 μm.

In the second and third panel portions A2 and A3, the border line between the first and second color filters 344 and 346 is shifted outwardly with respect to the central line of the data line 328 and the black matrix 342 inwardly extends as compared with the related art black matrix 42 (of FIG. 1) such that the central line of the black matrix 342 is disposed inside the border line between the first and second color filters 344 and 346. As a result, the black matrix 342 covers the data line 328 and the open portion OP of the black matrix 342 exposes the sub-pixel SP.

In the second and third panel portions A2 and A3, for example, the second and third BM widths BW2 and BW3 may be greater than the second and third DL widths DW2 and DW3 of the data line 328, respectively, (BW2>DW2, BW3>DW3) such that one side of the data line 328 coincides with one side of the black matrix 342 and the other side of the data line 328 is disposed within the other side of the black matrix 342.

Because light corresponding to a single data signal (a single gray level) applied to a single sub-pixel SP is emitted through a single color filter 344 or 346, color mixing or color crosstalk in which the colors of adjacent sub-pixels SP are mixed can be prevented. Thus, image display quality of the curved display device 310 is improved.

In the first panel portion A1, the black matrix 342 between the open portions OP has a first black matrix (BM) width BW1 and the open portion OP has a first open portion (OP) width OW1. In the second and third panel portions A2 and A3, the black matrix 342 between the open portions OP has second and third BM widths BW2 and BW3, respectively, and the open portion OP has second and third OP widths OW2 and OW3, respectively. The first, second and third BM widths BW1, BW2 and BW3 are equal to each other (BW1=BW2=BW3), the first, second and third OP widths OW1, OW2 and OW3 are equal to each other (OW1=OW2=OW3), the first DL width DW1 is greater than each of the second and third DL widths DW2 and DW3, and the second and third DL widths DW2 and DW3 are equal to each other (DW1>DW2=DW3).

In addition, the gap distances between adjacent data lines 328 are equal to each other throughout the whole of the first substrate 320.

The black matrix 342 between the open portions OP in the second panel portion A2 has the second BM width BW2 such that a left side of the black matrix 342 coincides with a left side of the data line 328 and the black matrix 342 covers the data line 328 by extending a right of the related art black matrix 42 (of FIG. 1) toward a center with respect to the border line between the first and second color filters 344 and 346. The black matrix 342 between the open portions OP in the third panel portion A3 has the third BM width BW3 such that a right side of the black matrix 342 coincides with a right side of the data line 328 and the black matrix 342 covers the data line 328 by extending a left of the related art black matrix 42 (of FIG. 1) toward a center with respect to the border line between the first and second color filters 344 and 346.

In addition, the data line 328 in the second panel portion A2 has the second DL width DW2 such that the data line 328 is shifted left by an extension width of the data line 328 of the first DL width DW1 in the first panel portion A1 and a left side of the data line 328 coincides with a left side of the black matrix 342. The data line 328 in the third panel portion A3 has the third DL width DW3 such that the data line 328 is shifted right by an extension width of the data line 328 of the first DL width DW1 in the first panel portion A1 and a right side of the data line 328 coincides with a right side of the black matrix 342.

In the curved display device 310, the open portion OP of the black matrix 342 has an equal width (OW1=OW2=OW3) throughout the whole of the first and second substrates 320 and 340, and the black matrix 342 has an equal width (BW1=BW2=BW3) throughout the whole of the first and second substrates 320 and 340. Accordingly, the color mixing and the color crosstalk are prevented and the display quality of an image is improved. Further, a uniform shape of the black matrix 342 and a uniform display quality are obtained throughout the whole of the plurality of sub-pixels of the second substrate 340.

Further, the first DL width DW1 is equal to the first BM width BW1 (DW1=BW1) so that both sides of the data line 328 can coincide with both sides of the black matrix 342 in the first panel portion A1, and each of the second and third DL widths DW2 and DW3 is smaller than the first DL width DW1 (DW2=DW3<DW1) so that one side of the data line 328 can coincide with one side of the black matrix 342 in the second and third panel portions A2 and A3. As a result, the plurality of sub-pixels SP have an equal disclination state.

Because the electric field at the both sides of the data line 328 is different from the normal electric field at the center of the sub-pixel SP, a portion of both sides of the data line 328 may have a disclination line having an abnormal transmittance or an abnormal color property. However, because both sides of the data line 328 coincide with both sides of the black matrix 342 in the first panel portion A1, each of the left and right sub-pixels SP of the data line 328 in the first panel portion A1 exposes the disclination lines at both sides of the data line 328 in the first panel portion A1. In addition, because one side of the data line 328 coincides with one side of the black matrix 342 and the other side of the data line 328 is covered with the black matrix 342 in the second and third panel portions A2 and A3, each sub-pixel SP in the second and third panel portions A2 and A3 exposes the disclination line at one side of the data line 328 in the second and third panel portions A2 and A3.

As a result, all of the plurality of sub-pixels SP have an equal disclination state where each sub-pixel exposes one disclination line throughout the whole of the first and second substrates 320 and 340, and a uniform display quality is obtained throughout the whole of the curved display device 310.

Although the first DL width DW1 in the first panel portion A1 is greater than each of the second and third DL widths DW2 and DW3 in the second and third panel portions A2 and A3 (DW1>DW2=DW3) in the third embodiment, the first, second and third DL widths DW1, DW2 and DW3 may be the same as each other (DW1=DW2=DW3) in another embodiment. Even when the first, second and third DL widths DW1, DW2 and DW3 may be the same as each other (DW1=DW2=DW3), a uniform black matrix 342 can be obtained throughout the whole of the sub-pixels SP of the second substrate 340 by forming the open portion OP of the black matrix 342 to have the same width (OW1=OW2=OW3) and forming the black matrix 342 to have the same width (BW1=BW2=BW3) throughout the whole of the first and second substrates 320 and 340.

Although the curved liquid crystal display device is exemplarily illustrated in the first to third embodiments, the present disclosure may be applied to a curved organic light emitting diode display device in which a color filter layer and a black matrix are formed on a light emitting diode in another embodiment. In addition, although the curved display device having a curved surface of a concave shape toward an upper portion of the second substrate where a user is located is exemplarily illustrated in the first to third embodiments, the present disclosure may be applied to a curved display device having a curved surface of a convex shape toward an upper portion of the second substrate where a user is located in another embodiment.

In the curved display device having a curved surface of a convex shape, a tensile stress from a center to an edge is generated in an inner surface of a first substrate and a compressive stress from an edge to a center is generated in an inner surface of a second substrate due to the curved shape. As a result, a length of a long side of a horizontal direction of the inner surface of the first substrate expands forward toward an edge, and a length of a long side of a horizontal direction of the inner surface of the second substrate contracts toward a center.

To obtain an equal width of an open portion and covering a data line, a black matrix of the second substrate has a first BM width in a first panel portion at a center of the first and second substrates such that a center line of the black matrix coincides with a border line between adjacent two color filters and has second and third BM widths each smaller than the first BM width BW1 in second and third panel portions, respectively, such that the black matrix of the first panel portion uniformly extends toward an edge of the second substrate with respect to a border line between the adjacent two color filters.

Alternatively, to obtain an equal width of an open portion and covering a data line, a black matrix of the second substrate has a first BM width in a first panel portion at a center of the first and second substrates such that a central line of the black matrix coincides with a border line between adjacent two color filters. The black matrix has second and third BM widths equal to or smaller than the first BM width in second and third panel portions, respectively, such that the black matrix of the first panel portion extends toward a center and an edge of the second substrate with respect to a border line between the adjacent two color filters differently by blocks and the position of the black matrix with respect to the border line between the adjacent two color filters gradually changes. The black matrix has fourth and fifth BM widths equal to or smaller than the first BM width in fourth and fifth panel portions, respectively, outside the second and third panel portions such that the black matrix of the first panel portion uniformly extends toward an edge of the second substrate with respect to the border line between the adjacent two color filters.

Alternatively, to obtain an equal width of an open portion and covering a data line, a black matrix of the second substrate has a first BM width in a first panel portion at a center of the first and second substrates such that a center line of the black matrix coincides with a border line between adjacent two color filters and has second and third BM widths each equal to the first BM width in second and third panel portions, respectively, such that the black matrix of the first panel portion uniformly moves toward an edge of the second substrate with respect to a border line between the adjacent two color filters. In addition, to obtain a uniform disclination state in the whole of the sub-pixels, the data line of the first substrate has a first DL width in the first panel portion such that both sides of the data line coincide with both sides of the black matrix and has second and third DL widths greater than the first DL width in the second and third panel portions, respectively, such that one side of the data line coincides with one side of the black matrix.

Consequently, in the curved display device according to the present disclosure, the open portion of the black matrix has an equal width, the central line of the black matrix in the first panel portion coincides with the border line between the adjacent two color filters, and the central line of the black matrix in the second and third panel portions is disposed inside or outside the border line between adjacent color filters. Accordingly, color mixing and color crosstalk are prevented.

In addition, the open portion of the black matrix has an equal width, the central line of the black matrix in the first panel portion coincides with the border line between adjacent color filters, and the central line of the black matrix in the second and third panel portions is disposed at a position that gradually changes by blocks with respect to the border line between adjacent color filters. Accordingly, color mixing and color crosstalk are prevented, the degree of design freedom is increased, and the aperture ratio, the brightness, as well as the image display quality are improved.

Further, the black matrix has an equal width, the open portion of the black matrix has an equal width, both sides of the data line coincide with both sides of the black matrix in the first panel portion, and one side of the data line coincides with one side of the black matrix in the second and third panel portions. Accordingly, color mixing and color crosstalk are prevented, image display quality is improved, and a uniform black matrix shape and a uniform display quality are obtained throughout all of the plurality of sub-pixels.

The first to third embodiments of the present disclosure may be combined with each other. Specifically, when the embodiment where the data line (DL) widths are adjusted and the embodiment where the black matrix (BM) widths are adjusted are combined with each other, variation of the aperture ratio according to the fabrication process is reduced. As a result, the display quality is improved and the production yield increases.

It will be apparent to those skilled in the art that various modifications and variations can be made in the curved display device of the present invention without departing from the spirit or scope of the invention. Thus, it is intended that the present invention cover the modifications and variations of this invention provided they come within the scope of the appended claims and their equivalents.

What is claimed is:

1. A curved display device, comprising:
   first and second substrates facing each other and spaced apart from each other, the first and second substrates having a curved shape, wherein the first and second substrates include a first panel portion at a center thereof, and second and third panel portions at respective sides of the first panel portion;
   gate and data lines on an inner surface of the first substrate, the gate and data lines crossing each other to define a plurality of sub-pixels;
   a black matrix on an inner surface of the second substrate, the black matrix defining a plurality of openings such that each opening of the plurality of openings corresponds to a respective one of the sub-pixels; and
   a plurality of color filters between the black matrix and the first substrate,
   wherein the black matrix between respective adjacent openings in the first panel portion has first black matrix widths (BM widths),
   wherein the black matrix between respective adjacent openings in the second panel portion has second BM widths,
   wherein the black matrix between respective adjacent openings in the third panel portion has third BM widths,
   wherein each opening of the plurality of openings in the first panel portion has a first opening width (OP width),
   wherein each opening of the plurality of openings in the second panel portion has a second OP width,
   wherein each opening of the plurality of openings in the third panel portion has a third OP width,
   wherein each of the second and third BM widths is greater than the first BM width,
   wherein the second and third BM widths are equal to each other, and
   wherein, in the second and third panel portions, a central line of the black matrix between horizontally adjacent openings is disposed closer to the first panel portion than a respective border line between adjacent overlapping ones of the plurality of color filters of different colors.

2. The device of claim 1, wherein the first to third OP widths are equal to each other.

3. The device of claim 1, wherein a central line of the black matrix between horizontally adjacent openings coincides with a respective border line between adjacent overlapping ones of the plurality of color filters of different colors in the first panel portion.

4. The device of claim 1, wherein, in the second and third panel portions, a relative position of the respective central lines with respect to the respective border lines gradually changes in the second and third panel portions.

5. The device of claim 4, wherein the second panel portion includes first to kth blocks and the third panel portion includes (k+1)th to (n+1)th blocks,
wherein, in the second panel portion, the central line of the black matrix is closer to the first panel portion than the respective border line between the adjacent ones of the plurality of color filters in the first to kth blocks,
wherein the respective central lines of the black matrix in the first to kth blocks become relatively closer to the respective border lines from the first block to the kth block,
wherein, in the third panel portion, the central line of the black matrix is closer to the first panel portion than the respective border line between the adjacent ones of the plurality of color filters in the (k+1)th to (n+1)th blocks, and
wherein the respective central lines of the black matrix in the (k+1)th to (n+1)th blocks become relatively closer to the respective border lines from the (n+1)th block to the (k+1)th block.

6. The device of claim 5, wherein the second and third panel portions further include a plurality of borders between the first to (n+1)th blocks, and
wherein a width of the black matrix between the openings in each of the plurality of the borders is smaller than a width of the black matrix between the openings in the first to (n+1)th blocks.

7. The device of claim 5, wherein a number (n+1) of the first to (n+1)th blocks is calculated by determining a value of a maximum shift magnitude between the first and second substrates due to the curved shape divided by a movement magnitude of the relative position of each central line of the black matrix between horizontally adjacent openings with respect to the border line between the adjacent two of the first to third color filters in adjacent two of the first to (n+1)th blocks, as n.

8. The device of claim 5, wherein each width of the black matrix between horizontally adjacent openings in each of the plurality of borders is determined as a value of a movement magnitude of the relative position of each central line of the black matrix between horizontally adjacent openings with respect to the border line between the adjacent two of the first to third color filters in adjacent two of the first to (n+1)th blocks subtracted from each width of the black matrix between horizontally adjacent openings in the first to (n+1)th blocks.

9. The device of claim 8, wherein a value of each width of the black matrix between horizontally adjacent openings in the first to (n+1)th blocks divided by each width the black matrix between horizontally adjacent openings in each of the plurality of border portions, is equal to or greater than (0.7/1) and equal to or smaller than (1/0.7).

10. The device of claim 4, wherein the first and second substrates further include fourth and fifth panel portions on a side of the second and third panel portions, respectively, opposite to the first panel portion,
wherein the black matrix between adjacent openings in the fourth and fifth panel portions has fourth and fifth BM widths, respectively,
wherein each opening in the fourth and fifth panel portions has fourth and fifth OP widths, respectively,
wherein each of the fourth and fifth BM widths is equal to the second BM width, and
wherein the first to fifth OP widths are equal to each other.

11. The device of claim 10, wherein, in the fourth and fifth panel portions, each central line of the black matrix between horizontally adjacent openings is closer to the first panel portion than a respective border line between the adjacent ones of the plurality of color filters of different colors.

12. The device of claim 1, wherein the data lines have first to third DL widths in the first to third panel portions, respectively,
wherein each of the second and third DL widths is smaller than the first DL width, and
wherein the second and third DL widths are equal to each other.

13. The device of claim 12, wherein both sides of each data line coincide with both sides of the black matrix at a location between respective horizontally adjacent openings in the first panel portion, and
wherein one side of each data line coincides with one side of the black matrix at a location between respective horizontally adjacent openings in the second and third panel portions, and
wherein another side of each data line is covered with the black matrix in the second and third panel portions.

14. The device of claim 1, wherein the first and second substrates have a curved surface of a concave shape toward an upper portion of the second substrate.

15. A curved display device, comprising:
first and second substrates facing each other and spaced apart from each other, the first and second substrates having a curved shape, wherein the first and second substrates include a first panel portion at a center thereof, and second and third panel portions at respective sides of the first panel portion;
gate and data lines on an inner surface of the first substrate, the gate and data lines crossing each other to define a plurality of sub-pixels;
a black matrix on an inner surface of the second substrate, the black matrix defining a plurality of openings such that each opening of the plurality of openings corresponds to a respective one of the sub-pixels; and
a plurality of color filters between the black matrix and the first substrate,
wherein the black matrix between respective adjacent openings in the first panel portion has first black matrix widths (BM widths),
wherein the black matrix between respective adjacent openings in the second panel portion has second BM widths,
wherein the black matrix between respective adjacent openings in the third panel portion has third BM widths,
wherein each opening of the plurality of openings in the first panel portion has a first opening width (OP width),
wherein each opening of the plurality of openings in the second panel portion has a second OP width,
wherein each opening of the plurality of openings in the third panel portion has a third OP width,
wherein each of the second and third BM widths is smaller than the first BM width, and
wherein the second and third BM widths are equal to each other.

16. The device of claim 15, wherein the first to third OP widths are equal to each other, and
wherein a central line of the black matrix between horizontally adjacent openings coincides with a respective border line between adjacent overlapping ones of the plurality of color filters of different colors in the first panel portion.

17. The device of claim 15, wherein, in the second and third panel portions, a central line of the black matrix between horizontally adjacent openings is disposed farther the first panel portion than a respective border line between adjacent overlapping ones of the plurality of color filters of different colors.

18. The device of claim 15, wherein, in the second and third panel portions, a central line of the black matrix between horizontally adjacent openings is disposed farther from the first panel portion than a respective border line between adjacent overlapping ones of the plurality of color filters of different colors, and wherein a relative position of the respective central lines with respect to the respective border lines gradually changes in the second and third panel portions.

19. The device of claim 15, wherein the first and second substrates have a curved surface of a convex shape toward an upper portion of the second substrate.

* * * * *